US010791004B2

(12) United States Patent
Jain et al.

(10) Patent No.: US 10,791,004 B2
(45) Date of Patent: Sep. 29, 2020

(54) METHODS AND APPARATUS FOR USE IN NETWORK OVERLAY FABRICS TO FACILITATE EXTERNAL NETWORK CONNECTIVITY INCLUDING ACCESS TO EXTRANET SHARED SERVICES

(71) Applicant: Cisco Technology, Inc., San Jose, CA (US)

(72) Inventors: Prakash Chand Jain, Fremont, CA (US); Sanjay Kumar Hooda, Pleasanton, CA (US); Victor M. Moreno, Carlsbad, CA (US); Satish Kumar Kondalam, Milpitas, CA (US)

(73) Assignee: Cisco Technology, Inc., San Jose, CA (US)

( * ) Notice: Subject to any disclaimer, the term of this patent is extended or adjusted under 35 U.S.C. 154(b) by 26 days.

(21) Appl. No.: 16/173,487

(22) Filed: Oct. 29, 2018

(65) Prior Publication Data
US 2020/0136862 A1    Apr. 30, 2020

(51) Int. Cl.
*G06F 15/177* (2006.01)
*H04L 12/46* (2006.01)
*H04L 12/741* (2013.01)
*H04L 12/713* (2013.01)
*H04L 12/715* (2013.01)

(52) U.S. Cl.
CPC ...... *H04L 12/4633* (2013.01); *H04L 12/4645* (2013.01); *H04L 45/586* (2013.01); *H04L 45/64* (2013.01); *H04L 45/74* (2013.01)

(58) Field of Classification Search
USPC ...................................................... 709/220
See application file for complete search history.

(56) References Cited

U.S. PATENT DOCUMENTS 6,907,039 B2    6/2005  Shen
6,970,464 B2    11/2005 Xu et al.
(Continued)

OTHER PUBLICATIONS

Craig Johnson, "Overlay Networks in the Datacenter," Feb. 2015, 99. 1-82, available at http://dfw.cisco-users.org/zips/20150204_DFWCUG_Overlay_Networks_In_The_Datacenter_pdf.
(Continued)

*Primary Examiner* — Alicia Baturay
(74) *Attorney, Agent, or Firm* — Merchant & Gould P.C.

(57) ABSTRACT

In one example, a router is configured to process communications according to a tunneling protocol to provide network overlay tunnels to facilitate virtual private networks (VPNs) for hosts, and to process communications associated with an external network with use of a provider virtualization routing and forwarding (VRF) instance. With use of a subscription function, the router receives an initial set of extranet VPN prefixes associated with the network overlays for storage in association with the provider VRF, as well as regularly receive publications of updates to extranet VPN prefixes associated with the network overlays. With use of a route obtaining function, the router, in response to receiving a communication associated with one of the stored extranet VPN prefixes at the provider VRF, sends to a communications management server a message indicating request for a host-to-router mapping and receive from the communications management server a reply including the host-to-router mapping.

19 Claims, 18 Drawing Sheets

(56) References Cited

U.S. PATENT DOCUMENTS

| | | | |
|---|---|---|---|
| 7,720,009 B2* | 5/2010 | Mellachervu | H04L 12/4641 370/255 |
| 7,894,450 B2* | 2/2011 | Unbehagen | H04L 12/4662 370/254 |
| 8,166,205 B2* | 4/2012 | Farinacci | H04L 12/4641 709/249 |
| 8,171,538 B2* | 5/2012 | El Husseini | H04L 63/0281 726/12 |
| 8,194,664 B2* | 6/2012 | Dharwadkar | H04L 12/4641 370/249 |
| 8,346,909 B2* | 1/2013 | Dan | G06F 9/5083 709/224 |
| 9,985,867 B2 | 5/2018 | Dong et al. | |
| 10,127,237 B2* | 11/2018 | Jain | G06F 16/182 |
| 10,409,649 B1* | 9/2019 | Young | G06F 9/4881 |
| 10,484,281 B1* | 11/2019 | Mucci | H04L 45/16 |
| 2009/0296575 A1* | 12/2009 | Nakai | H04L 65/80 370/230 |
| 2017/0230198 A1 | 8/2017 | Xu | |
| 2018/0367328 A1* | 12/2018 | Hooda | H04L 61/103 |
| 2018/0367337 A1* | 12/2018 | Jain | H04L 45/74 |

OTHER PUBLICATIONS

Sajassi et al., "BGP MPLS-Based Ethernet VPN," Internet Engineering Task Force (IETF), Request for Comments: 7432, Standards Track, Feb. 2015, pp. 1-56, available at https://tools.ietf.org/html/rfc7432.

Sajassi et al., "Integrated Routing and Bridging in EVPN," Internet Engineering Task Force (IETF), Internet-Draft, L2VPN Workgroup, Standards Track, Jul. 2018, pp. 1-34, available at https://tools.ietf.org/html/draft-ietf-bess-evpn-inter-subnet-forwarding-05.

* cited by examiner

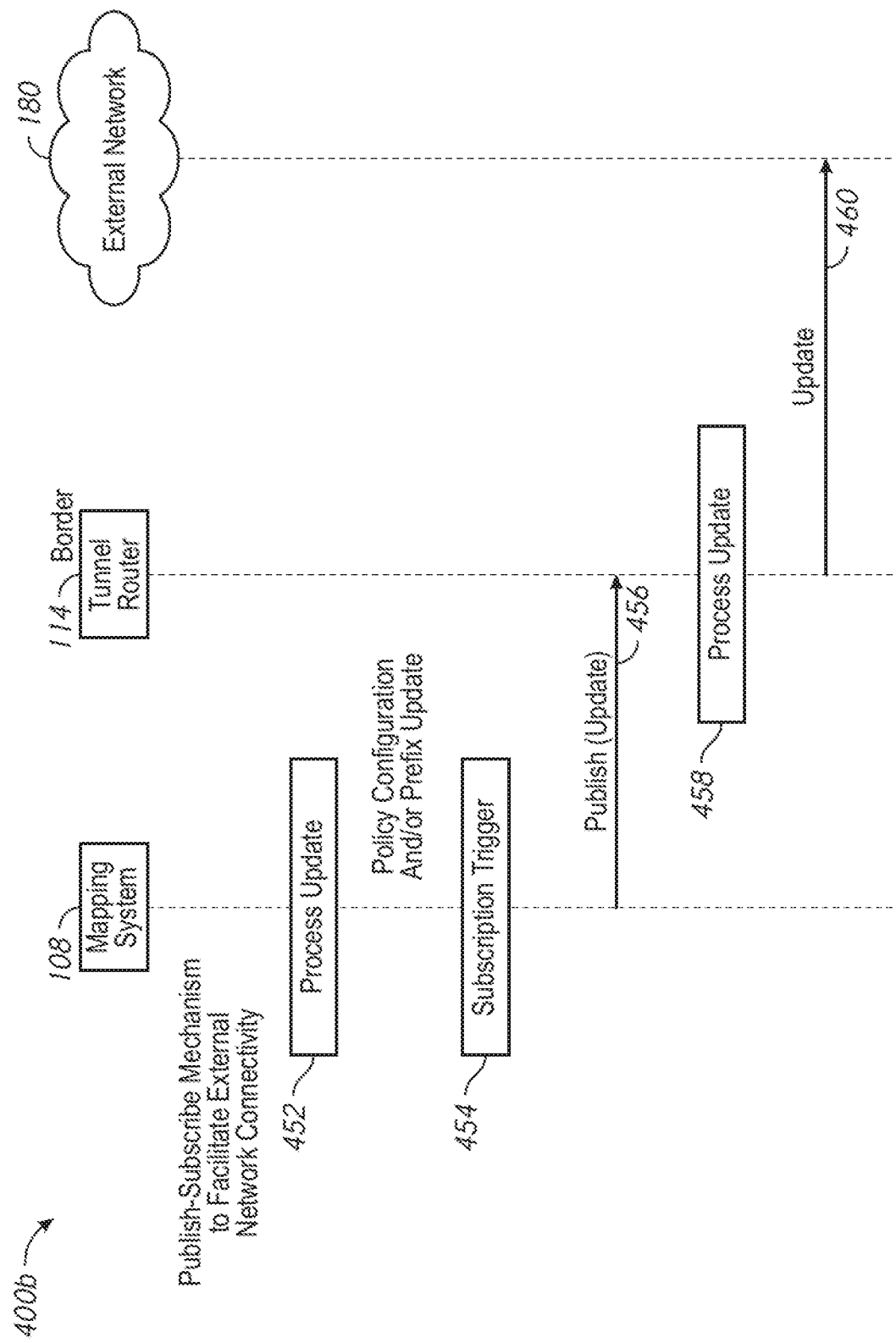

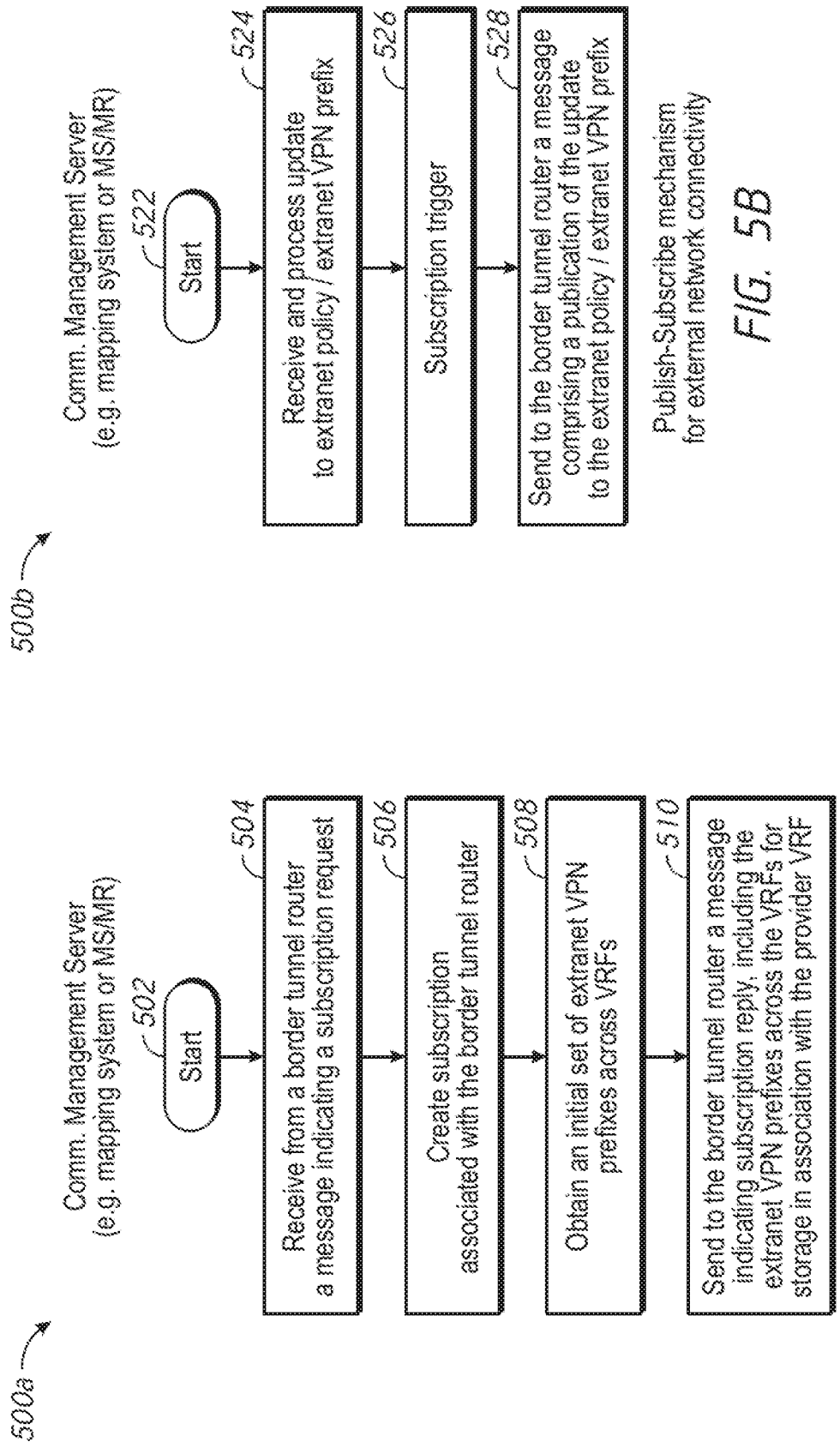

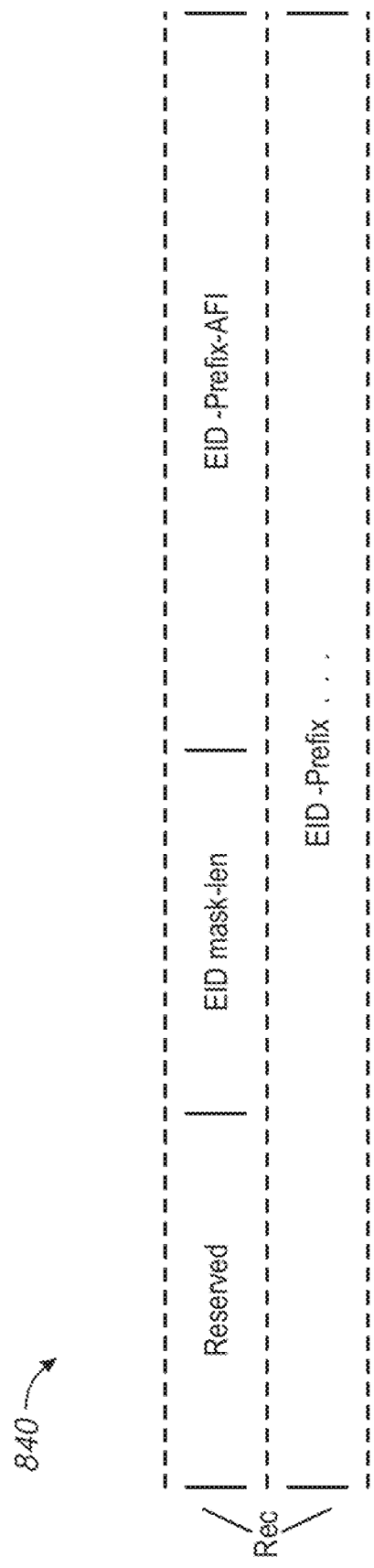

METHODS AND APPARATUS FOR USE IN NETWORK OVERLAY FABRICS TO FACILITATE EXTERNAL NETWORK CONNECTIVITY INCLUDING ACCESS TO EXTRANET SHARED SERVICES

TECHNICAL FIELD

The present disclosure relates generally to methods and apparatus for use in network overlay fabrics to facilitate external network connectivity including access to extranet shared services.

BACKGROUND

There is a need for methods and apparatus for use in a network overlay fabric to better facilitate external network connectivity including access to shared services in an external (e.g. extranet) network.

BRIEF DESCRIPTION OF THE DRAWINGS

So that the present disclosure can be understood by those of ordinary skill in the art, a more detailed description may be had by reference to aspects of some illustrative implementations, some of which are shown in the accompanying drawings.

FIGS. 4A-4B are message flow diagrams for describing publish-subscribe-based methods to provide an auto-configurable, external network connectivity in in a network overlay fabric, such as the network overlay fabric in the network infrastructure arrangements in FIGS. 1D and 1E, according to the first set of inventive aspects of the present disclosure.

FIGS. 5A-5C are flowcharts for describing publish-subscribe-based methods to provide an auto-configurable, external network connectivity in a network overlay fabric, such as the network overlay fabric in the network infrastructure arrangements in FIGS. 1D and 1E, according to the first set of inventive aspects of the present disclosure.

FIGS. 8A-8C are message formats of messages (e.g. map requests, map replies) which may be used for implementations involving LISP.

Figure 1A:
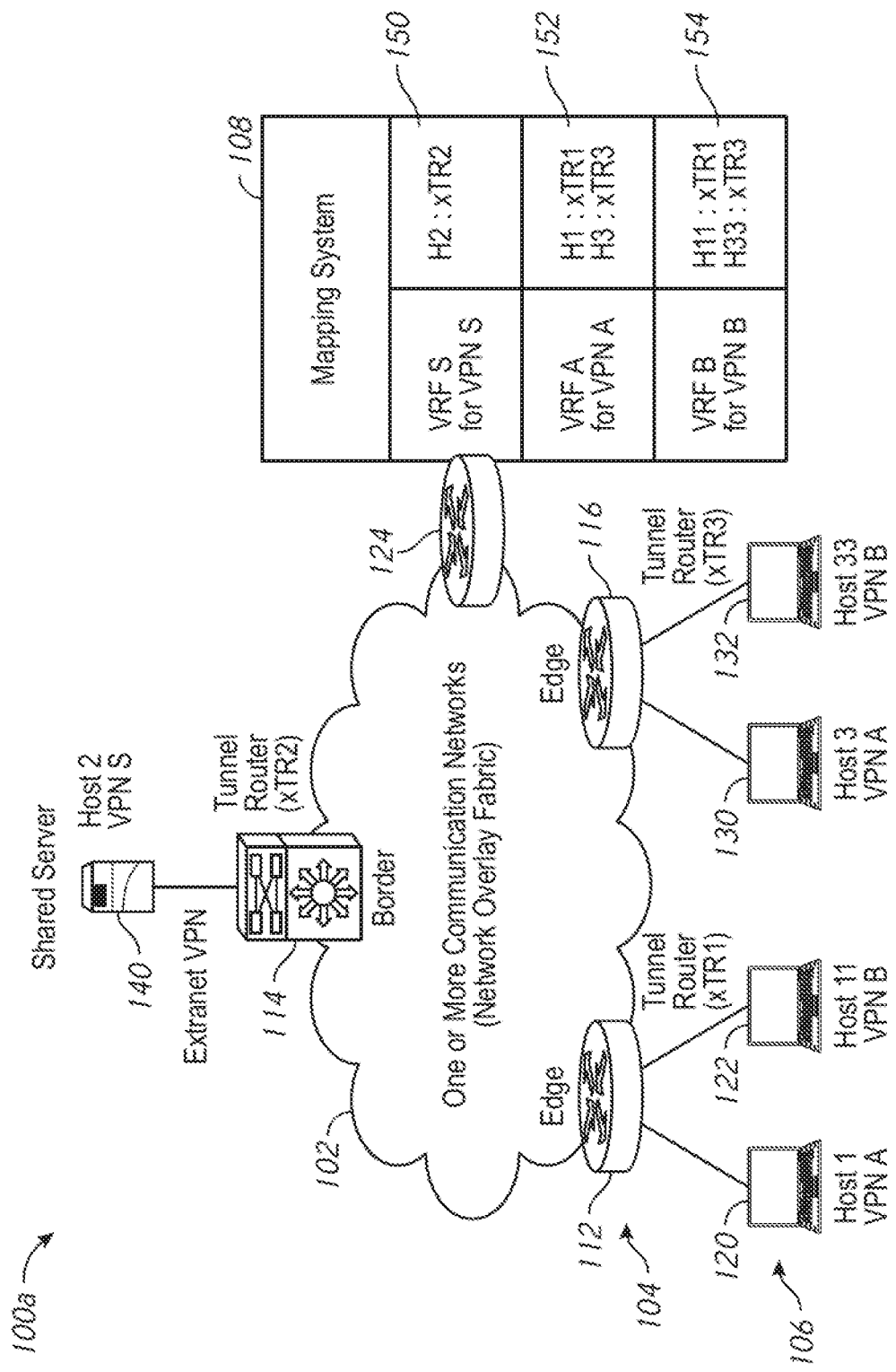
FIGS. 1A-1B are illustrative representations of a network infrastructure arrangement in one or more communication networks, wherein each one of a plurality of tunnel routers may be configured to process communications in accordance with a tunneling protocol to provide network overlay tunnels in the one or more communication networks to facilitate virtual private networks (VPNs) for hosts, and wherein a mapping system may be used for storing and providing host-to-router mappings for the communications.

In accordance with common practice the various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

DESCRIPTION OF EXAMPLE EMBODIMENTS

Numerous details are described in order to provide a thorough understanding of the example implementations shown in the drawings. However, the drawings merely show some example aspects of the present disclosure and are therefore not to be considered limiting. Those of ordinary skill in the art will appreciate that other effective aspects and/or variants do not include all of the specific details described herein. Moreover, well-known systems, methods, components, devices and circuits have not been described in exhaustive detail so as not to obscure more pertinent aspects of the example implementations described herein.

Overview

Methods and apparatus for use in a network overlay fabric to better facilitate external network connectivity including access to extranet shared services are described herein.

In a first set of inventive aspects of the present disclosure, what are described are publish-subscribe-based methods and apparatus for use in a network overlay fabric to provide an auto-configurable, external network connectivity. In a second set of inventive aspects of the present disclosure, what are described are methods and apparatus for use in a network overlay fabric for a secure group-based access to shared services in an external (e.g. extranet) network. In a third set of inventive aspects of the present disclosure, what are described are methods and apparatus for use in a network overlay fabric to facilitate a reliable, failsafe access to shared services in an external (e.g. extranet) network.

In the first set of inventive aspects, publish-subscribe-based methods and apparatus for use in a network overlay fabric to provide an auto-configurable, external network connectivity are provided. In one illustrative example, a router may be configured to process communications in accordance with a tunneling protocol (e.g. LISP) to provide network overlay tunnels in one or more communication networks to facilitate virtual private networks (VPN) for hosts, and to process communications associated with an external communication network (e.g. a non-LISP network) with use of a provider virtualization routing and forwarding (VRF) instance. With use of a subscription function, the router may receive from a communications management server or entity an initial set of extranet VPN prefixes associated with the network overlays for storage in association with the provider VRF, as well as receive publications of updates to extranet VPN prefixes associated with the network overlays. With use of a route obtaining function, the router may, in response to receiving a communication associated with one of the stored extranet VPN prefixes at the provider VRF, send to the communications management server a message indicating request for a host-to-router mapping and receive from the communications management server a message indicating a reply which includes the host-to-router mapping.

In the second set of inventive aspects, method and apparatus for use in a network overlay fabric for a secure group-based access to shared services in an external (e.g. extranet) network are provided. In one illustrative example, a communications management server or entity may be configured for use with a plurality of routers in one or more communications networks, wherein each router is configured to communicate in accordance with a tunneling protocol to provide network overlay tunnels in the one or more communication networks to facilitate VPNs for hosts. The server may be a mapping system or a map server/map resolver (MS/MR). The server may receive a message indicating a request for a host-to-router mapping for a host comprising a shared server in a remote extranet VPN, in response to the router's receipt of a data packet communication destined to the shared server in the remote extranet VPN. The server may obtain communication policy data based on a source identifier in the message, where the communication policy data includes a security group tag (e.g. SGT) associated with a security group. Based on destination host registration and the communication policy data allowing the data packet communication for the security group, the server may send to the router a message indicating a reply which includes the host-to-router mapping for the host comprising the shared server, as well as source and destination security group tags (e.g. SGT and DGT) and associated policy. On the other hand, based on the communication policy data prohibiting the data packet communication for the security group, the server may send to the router a message indicating a reply which includes an indication to drop the data packet communication.

In the third set of inventive aspects, methods and apparatus for use in a network overlay fabric to facilitate a reliable, failsafe access to shared services in an external (e.g. extranet) network using a probing mechanism are provided. In one illustrative example, a router (e.g. an "edge" router) may be configured to process communications in accordance with a tunneling protocol to provide network overlay tunnels in one or more communication networks to facilitate VPNs for hosts. The router may be configured to maintain a host-to-router mapping for forwarding data plane traffic to a host of an extranet VPN via a first border router. The router may be further configured to send to the first border router a message comprising a probe and receive from the first border router a message comprising a probe reply. In response to identifying, in the message comprising the probe reply, an indication that the host or its external network is unreachable via the first border router, the router may change the host-to-router mapping in the router so that data plane traffic with the host of the extranet VPN is forwarded via a second border router.

More detailed and alternative techniques and implementations are provided herein as will be described below.

Example Embodiments

A network overlay may employ software virtualization to create an additional layer of network abstraction on top of a physical network. Such a network overlay may be used to provide virtual private networking (VPN) for hosts in a network. Specifically, routers in the network may be configured to operate using a network overlay protocol to facilitate VPN networking. The protocol may be, for example, Locator ID/Separation Protocol (LISP); however, other suitable alternatives may be utilized, such as Virtual Extensible LAN (VXLAN), Enhanced VLAN (EVLAN), or Identifier Locator Addressing (ILA). Here, the routers create and maintain multiple VPN instances comprising forwarding tables for the routing of user plane traffic associated with different VPNs.

The technology utilized may be based on or referred to as virtual routing and forwarding (VRF) technology. Such network virtualization creates multiple, logically-separated topologies across one common physical infrastructure. Network reachability within a VPN is typically restricted to the addresses of the end-points that are members of the VPN. Such a level of segmentation is useful in providing fault isolation, enforcing access-control restrictions, enabling the use of a single network by multiple tenants, and scoping network policy per VPN.

Again, a protocol referred to as LISP may be used to create and maintain VPNs. LISP provides two namespaces: an End-point Identifier (EID) namespace and a Routing Locator (RLOC) namespace. A host (e.g. a computer or a server) may be associated with an EID (e.g. an IP address), whereas a router may be associated with an RLOC (e.g. an IP address). A router may be an ingress tunnel router (ITR), an egress tunnel router (ETR), or a combination thereof (ITR+ETR=XTR).

A LISP Mapping System (e.g. including a mapping server and/or database) maps EIDs to RLOCs. Either the EID space, the RLOC space, or both, may be segmented. The LISP Mapping System can be used to map a segmented EID address space to the RLOC space. When the EID namespace is segmented, a LISP Instance-ID (IID) is encoded in both the data plane and the control plane to provide segmentation as well as to disambiguate overlapping EID Prefixes. This allows multiple VRFs to share a common routing locator network while maintaining EID prefix segmentation.

In a LISP VPN, XTRs that are members of the VPN should be configured with a forwarding context (e.g. a VRF) and the associated IID for the VPN. Based on this configuration, the ETRs must register the EIDs within the forwarding context as Extended EIDs (IID+EID). The LISP mapping system consolidates the registrations from all the ETRs in the VPN and builds a mapping database for the VPN. ITRs that are members of the VPN will do forwarding lookups in the forwarding context where traffic was received. Upon a cache miss within the forwarding context, the ITR will issue a Map-Request for the destination EID and include the VPN's IID. This information will be encoded as an Extended EID (IID+EID) in the Map-Request issued. The IID to associate with the EID in this Map-request is derived from the configuration of the VPN's forwarding context (in which the traffic was received). The Mapping System should reply to the Map Request with a Mapping for the Extended EID (IID+EID), the IID of the Extended EID should be used to identify the forwarding context in which the Mapping received should be cached.

Once a mapping has been cached in the VPN's forwarding context, the ITR will encapsulate the traffic towards the RLOC in the mapping. The IID corresponding to the VPN's forwarding context must be included in the IID field of the data plane header. When the encapsulated traffic is received at the ETR, the encapsulation header is removed and the IID received in the header is used to identify the forwarding context to use to do a forwarding lookup for the decapsulated traffic.

Extranet VPN support may also be provided using LISP. Typically, an extranet allows for communication across multiple VPNs, subject to policy constraints, in which each "subscriber" VPN may communicate with a "provider" VPN to access a shared service but be restricted from communicating with each other via the provider VPN. LISP specifically allows for distributed extranet VPN support. Here, as the extranets are not centralized but rather distributed to ITRs, there is no centralized point of failure. For extranet routes, an ITR may operate to encapsulate user plane traffic associated with the IID corresponding to the VPN connected to the ETR. Extranet routes may be installed at the ITR with the IID corresponding to the destination VPN.

As described herein, methods and apparatus for use in a network overlay fabric to better facilitate external network connectivity including access to extranet shared services are provided. In a first set of inventive aspects of the present disclosure, what are described are publish-subscribe-based methods and apparatus for use in a network overlay fabric to provide an auto-configurable, external network connectivity. In a second set of inventive aspects of the present disclosure, what are described are methods and apparatus for use in a network overlay fabric for a secure group-based access to shared services in an external (e.g. extranet) network. In a third set of inventive aspects of the present disclosure, what are described are methods and apparatus for use in a network overlay fabric to facilitate a reliable, failsafe access to shared services in an external (e.g. extranet) network using a probing mechanism. Although some implementations of the present disclosure are applied to an extranet as described herein, the present techniques may also be readily applied to other types of external networks (i.e. non-extranet).

To illustrate, FIG. 1A is an illustrative representation of a network infrastructure arrangement 100A in one or more communication networks 102, wherein tunneling protocols are utilized to establish and maintain network overlay tunnels to provide VPNs. The one or more communication networks 102 may include a plurality of routers 104. The plurality of routers 104 may be and/or be referred to as tunnel routers, each of which may be configured to perform a network overlay or "tunneling" protocol for establishing and maintaining network overlays or tunnels across the one or more communication networks 102. The plurality of routers 104 illustrated in FIG. 1 include a tunnel router 112, a tunnel router 114, and a tunnel router 116. Tunnel routers 112 and 116 may be referred to as "edge" tunnel routers whereas tunnel router 114 may be referred to as a "border" tunnel router.

A plurality of hosts 106 may be connected in the one or more communication networks 102. The plurality of hosts 106 illustrated in FIG. 1 include a host 120 ("host 1" or H1) and a host 122 ("host 11" or H11) connected via router 112, a host 140 ("host 2" or H2) connected via router 114, and a host 130 ("host 3" or H3) and a host 132 ("host 33" or H33) connected via router 116. As indicated in FIG. 1, hosts 120 and 130 are members of the same VPN, "VPN A" associated with VRF A. Similarly, hosts 122 and 132 are members of the same VPN, "VPN B" associated with VRF B. Host 140 may be a member of "VPN S" associated with VRF S. Host 140 may be a shared server which is accessible to hosts 120, 122, 130, and 132 via VPN S, which may be a remote extranet VPN.

One or more mapping servers or systems 108 may be connected in the one or more communication networks 102. The mapping system 108 may be more generally referred to as a communications management server or entity. Hosts 106 may register with mapping system 108 to provide their (route/router) locations in the network, for example, in the form of host-to-router mappings. Mapping system 108 may be or include, for example, a map server (MS)/map resolver (MR) system of LISP.

Registrations of the hosts 106 in mapping system 108 are indicated in FIG. 1A. More specifically, registrations associated with VPN A/VRF A includes host-to-router mappings 152 between host 120 and router 112 (i.e. H1: xTR1) and between host 130 and router 116 (i.e. H3: xTR3); registrations associated with VPN B/VRF B includes host-to-router mappings 154 between host 122 and router 112 (i.e. H11: xTR1) and between host 132 and router 116 (i.e. H33: xTR3); and a registration associated with VPN S/VRF S includes a host-to-router mapping 150 between host 140 and router 114 (i.e. H2: xTR2).

Figure 1B:
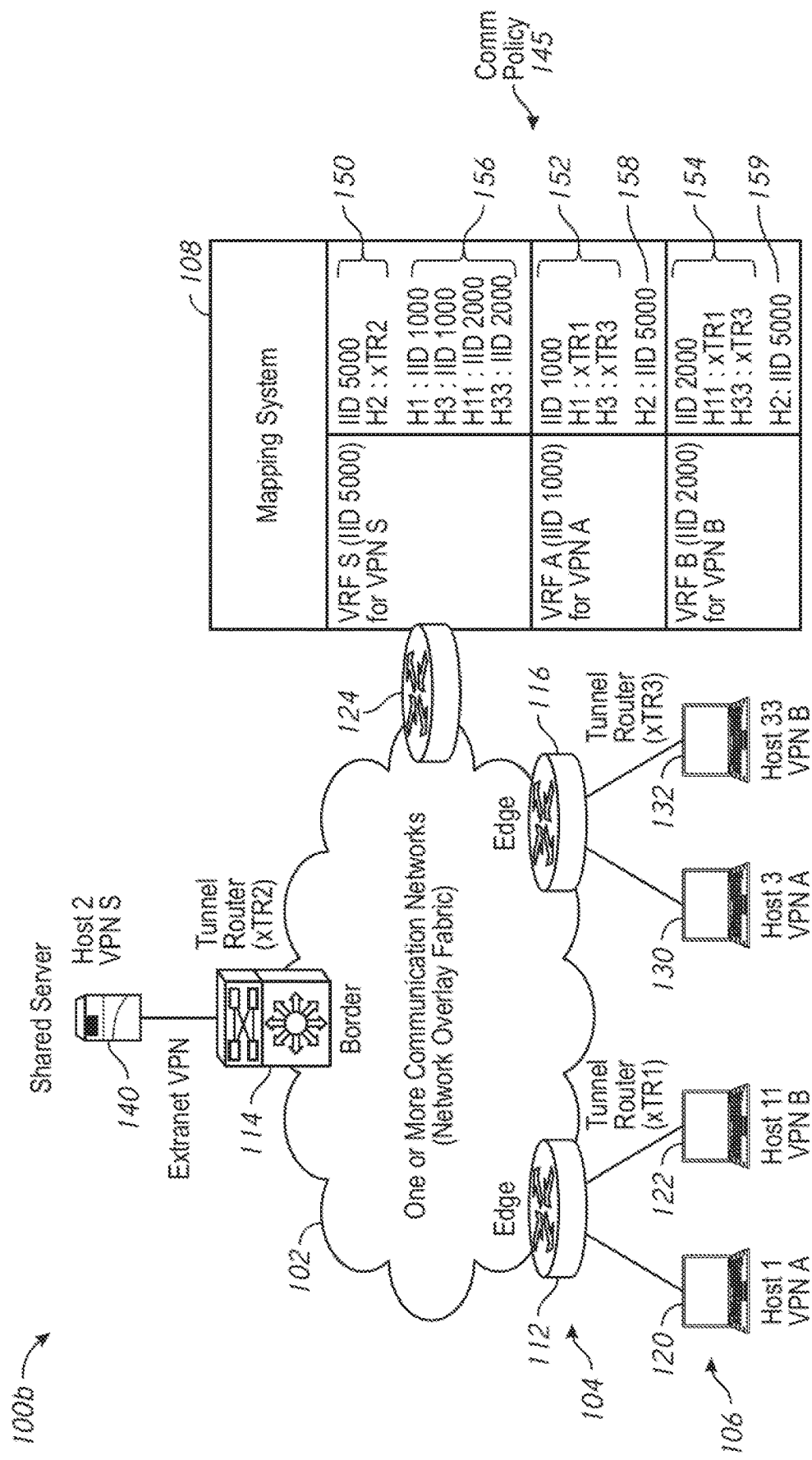

FIG. 1B is an illustrative representation of a network infrastructure arrangement 100B which is the same as the arrangement 100A of FIG. 1A, but further includes policy data 145 of a communication policy to further facilitate communications. The policy data 145 may be or include a cross-VRF communication policy. In FIG. 1B, the same registrations of hosts 106 as well as their host-to-router mappings in mapping system 108 of FIG. 1A are indicated. Hosts 120 and 130 are members of the same VPN, which is VPN A associated with VRF A and an Instance ID (IID) of 1000; an extranet policy 158 for VPN A allows communication with host 140 associated with IID of 5000 (H2: IID 5000). Hosts 122 and 132 are members of the same VPN, which is VPN B associated with VRF B and an IID of 2000; an extranet policy 159 for VPN B allows communication with host 140 associated IID of 5000 (H2: IID 5000). On the other hand, host 140 may be a member of VPN S associated with VRF S and an IID of 5000; an extranet policy 156 for VPN S allows communication with hosts 120 and 130 associated with IID of 1000 (H1: IID 1000; H3: IID 1000) and hosts 122 and 132 associated with IID of 2000 (H11: IID 2000; H33: IID 2000).

In FIG. 1B (as well as in FIGS. 1C-1D described later below), what is shown is merely an illustrative example using a single table with host entries pointing to extranet IIDs. In another illustrative example, a more efficient implementation may be provided using a separate policy table and iterative look-ups. In such implementation, what may be used is a first table of the mappings of FIG. 1A together with the inclusion of IIDs and a second table which simply indicates the communication policy in order to provide the system with sufficient information to perform look-ups across the VRFs. Other variations are possible as well.

Figure 2A:
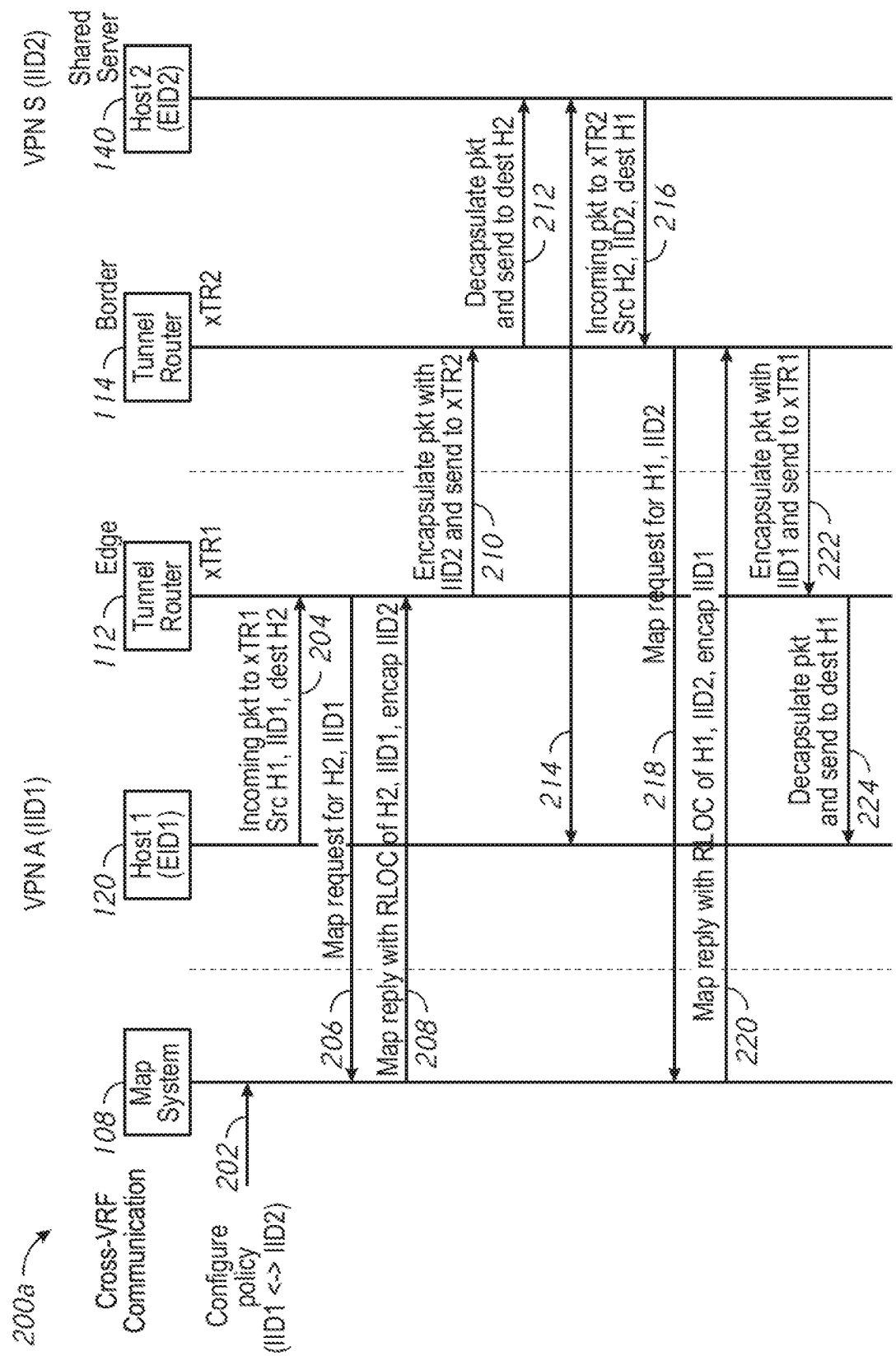
FIG. 2A is a message flow diagram for describing a general method of processing communications to facilitate access to extranet shared services in a network overlay fabric, such as the network overlay fabric in the network infrastructure arrangements in FIGS. 1A, 1B, 1D, and 1E.

Referring ahead now to FIG. 2A, a process flow diagram 200A for describing a general method of providing route information to routers across VPNs to facilitate extranet VPN communication according to some implementations of the present disclosure is now described. The method may involve cross-VRF communication. The method of FIG. 2A may be employed in a network infrastructure arrangement described in relation to FIG. 1A or 1B, with the following simplifications for clarity: host 120 (i.e. Host 1) is a member of VPN A associated with "IID1" and host 140 (i.e. Host 2) is a member of VPN S associated with "IID2" which is a remote extranet VPN; host 120 (i.e. Host 1) may be identified by EID1 and host 140 (i.e. Host 2) may be identified by EID2.

In FIG. 2A, mapping system 108 may receive a message indicating an instruction to configure or update a communication policy in mapping system 108 (step 202 of FIG. 2A). The communication policy may be or be referred to a cross-VRF communication policy. The extranet cross-VRF communication policy may instruct mapping system 108 to facilitate extranet cross-VRF communication between VRF A of VPN A associated with IID1 and VRF S of VPN S associated with IID2. Subsequently, after configuration of the policy, a communication may be initiated by host 120 in VPN A. More specifically, host 120 in VPN A may send to tunnel router 112 a message comprising a data packet intended for host 140 of VPN S (step 204 of FIG. 2A). The data packet may be an IP data packet. The data packet may have a source address corresponding to host 120 in VPN A, a destination address corresponding to host 140 in VPN S, and indicate a context of IID1 of VPN A. The tunnel router 112 may receive the data packet and, in response, send to mapping system 108 a message indicating a map request for requesting a router mapping associated with host 140 (step 206 of FIG. 2A). The map request may include the context of IID1 of VPN A. Mapping system 108 may receive the message indicating the map request and, in response, send to tunnel router 112 a message indicating a map reply (step 208 of FIG. 2A). The map reply may include the address of the tunnel router (e.g. the RLOC) which is mapped to host 140 in VPN S, the context of IID1 of VPN A, and an encapsulated IID2 associated with the VPN S. The RLOC may be the address for tunnel router 116 in the VPN S. The tunnel router 112 may receive the message indicating the map reply and, in response, proceed with the forwarding of the data packet to host 140. Here, tunnel router 112 may encapsulate the earlier-received data packet with IID2 associated with VPN S and send to tunnel router 114 the encapsulated data packet (step 210 of FIG. 2A). The tunnel router 114 may receive the encapsulated data packet and, in response, decapsulate the data packet and send the data packet to host 140 of VPN S (step 212 of FIG. 2A). Host 140 of VPN S may receive and process the data packet. Further communication may then proceed between host 120 of VPN A and host 140 of VPN S (step 214 of FIG. 2A).

Similar processing may be performed for communications initiated by a host (e.g. host 140) in the VPN S. More particularly, host 140 in VPN S may send to tunnel router 114 a message comprising a data packet intended for host 120 of VPN A (step 216 of FIG. 2A). The data packet may be an IP data packet. The data packet may have a source address corresponding to host 140 in VPN S, a destination address corresponding to host 120 in VPN A, and indicate a context of IID2 of VPN S. The tunnel router 114 may receive the data packet and, in response, send to mapping system 108 a message indicating a map request to request a router mapping associated with host 120 (step 218 of FIG. 2A). The map request may include the context of IID2 of VPN S. Mapping system 108 may receive the message which includes the map request and, in response, send to tunnel router 114 a message which includes a map reply (step 220 of FIG. 2A). The map reply may include the address of the router that is mapped to host 120 in VPN A, the context of IID2 of VPN S, and an encapsulated IID1 associated with the VPN A. The tunnel router 114 may receive the message indicating the map reply and, in response, proceed with the forwarding of the data packet to host 120. Here, tunnel router 116 may encapsulate the earlier-received data packet with IID1 associated with VPN A and send to tunnel router 112 the encapsulated data packet (step 222 of FIG. 2A). The tunnel router 112 may receive the encapsulated data packet and, in response, decapsulate the data packet and send the data packet to host 120 of VPN A (step 224 of FIG. 2A). Host 120 of VPN A may receive and process the data packet. Further communication may then proceed between host 120 of VPN A and host 140 of VPN S.

Referring back now to FIG. 1C, an illustrative representation of a network infrastructure arrangement 100C which is the same as the arrangement 100B of FIG. 1B is shown, but further illustrating that (border) tunnel router 114 may provide external network connectivity to an external network 180 (e.g. the Internet) via a router 182. External network 180 does not employ the same network overlay protocol (e.g. LISP) used in communication network 102. To provide external network connectivity, a complex routing protocol such as border gateway protocol (BGP) 190 may be required according to conventional techniques. A more automatic and efficient process may be desirable for providing such external network connectivity without use of such legacy routing protocol.

Figure 1C:
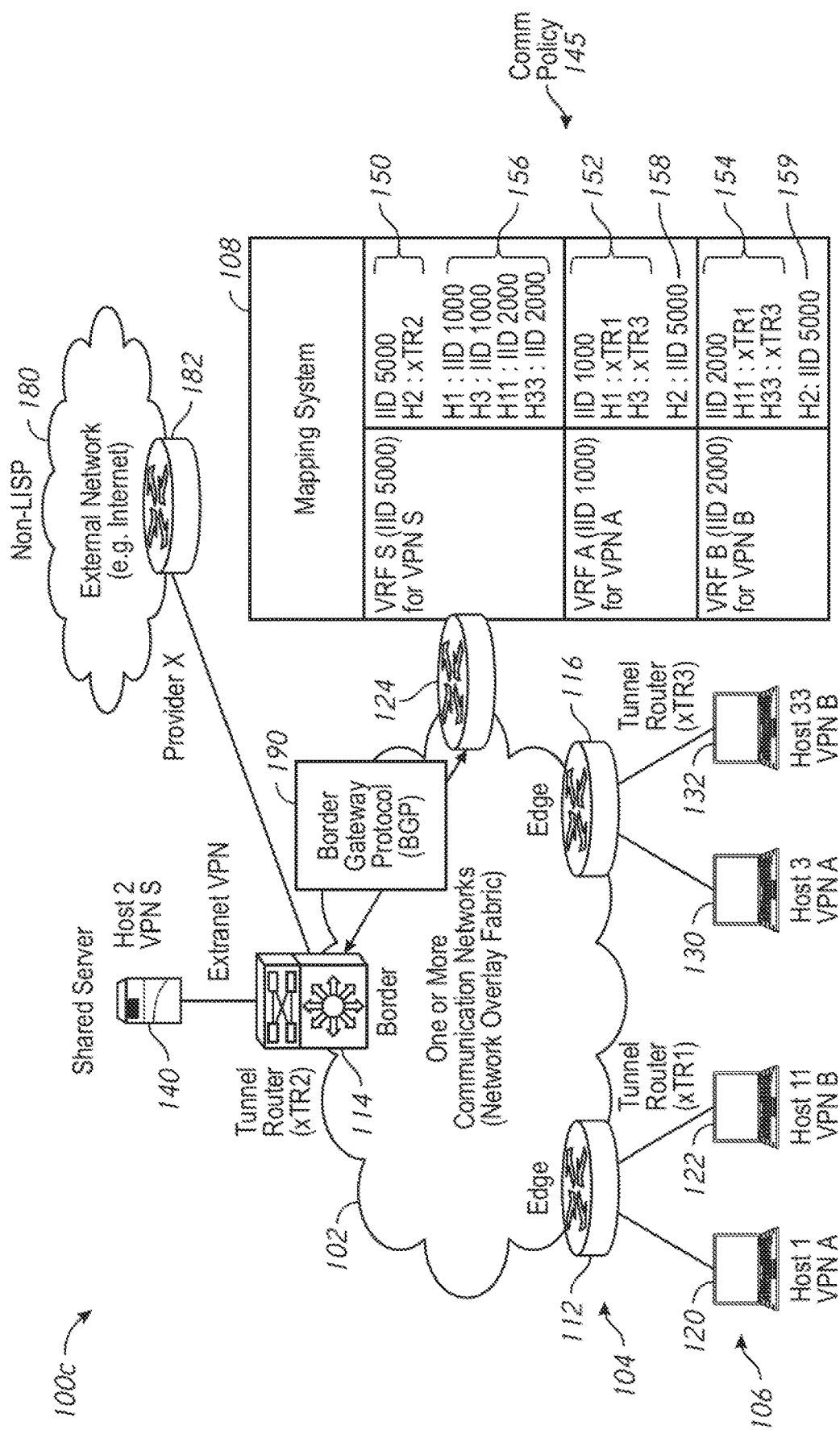
FIG. 1C is an illustrative representation of the network infrastructure arrangement of FIG. 1B, wherein a complex routing protocol such as border gateway protocol (BGP) may be required between the mapping system and one or the tunnel routers to facilitate connectivity to an external communication network in accordance with conventional techniques.
Figure 1D:
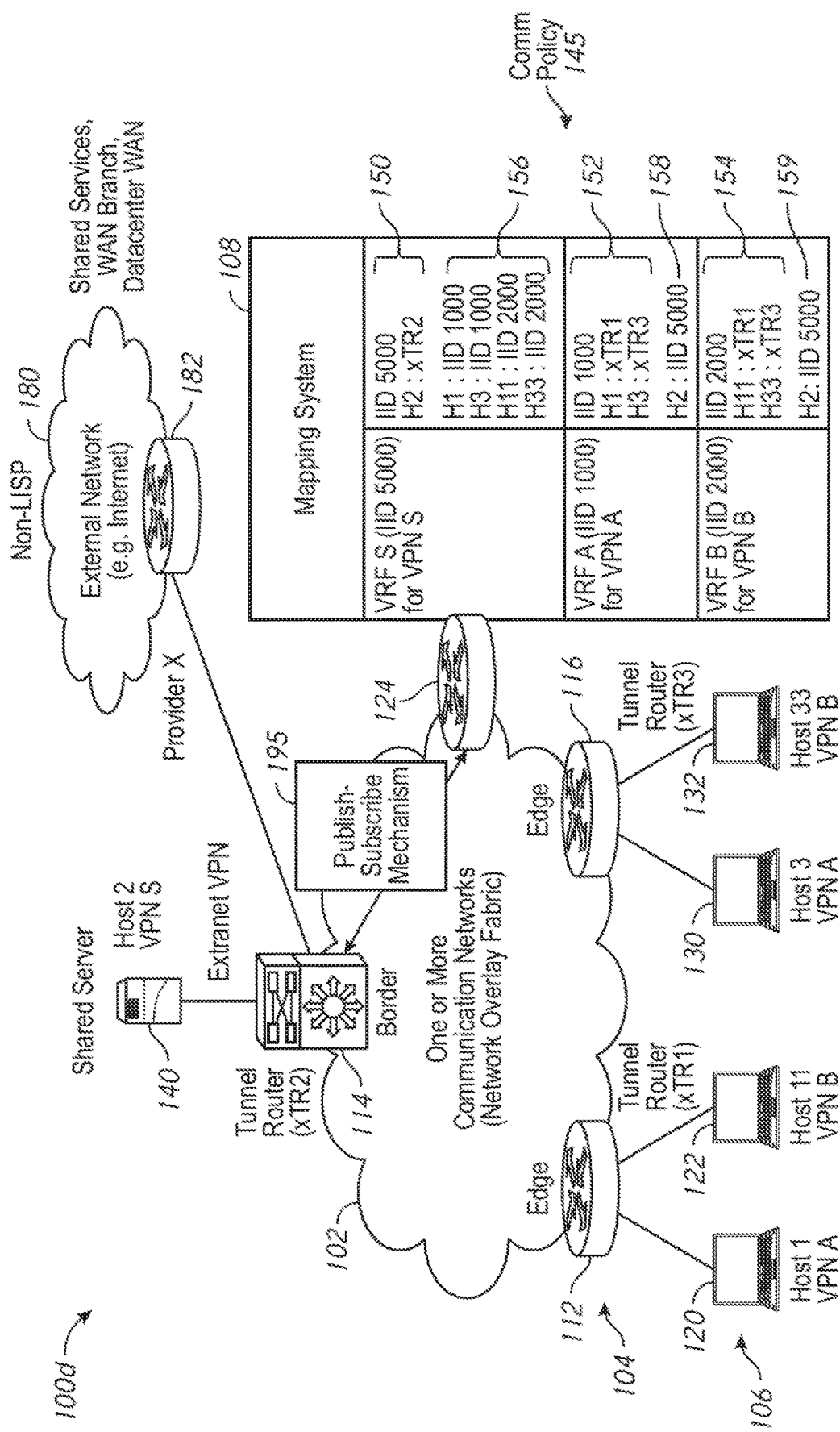
FIG. 1D is an illustrative representation of the network infrastructure arrangement of FIG. 1C, wherein a publish-subscribe-based mechanism may be utilized between the mapping system and the tunnel router to provide an auto-configurable, external network connectivity according to a first set of inventive aspects of the present disclosure, without use of the complex routing protocol of FIG. 1C.
Figure 2B:
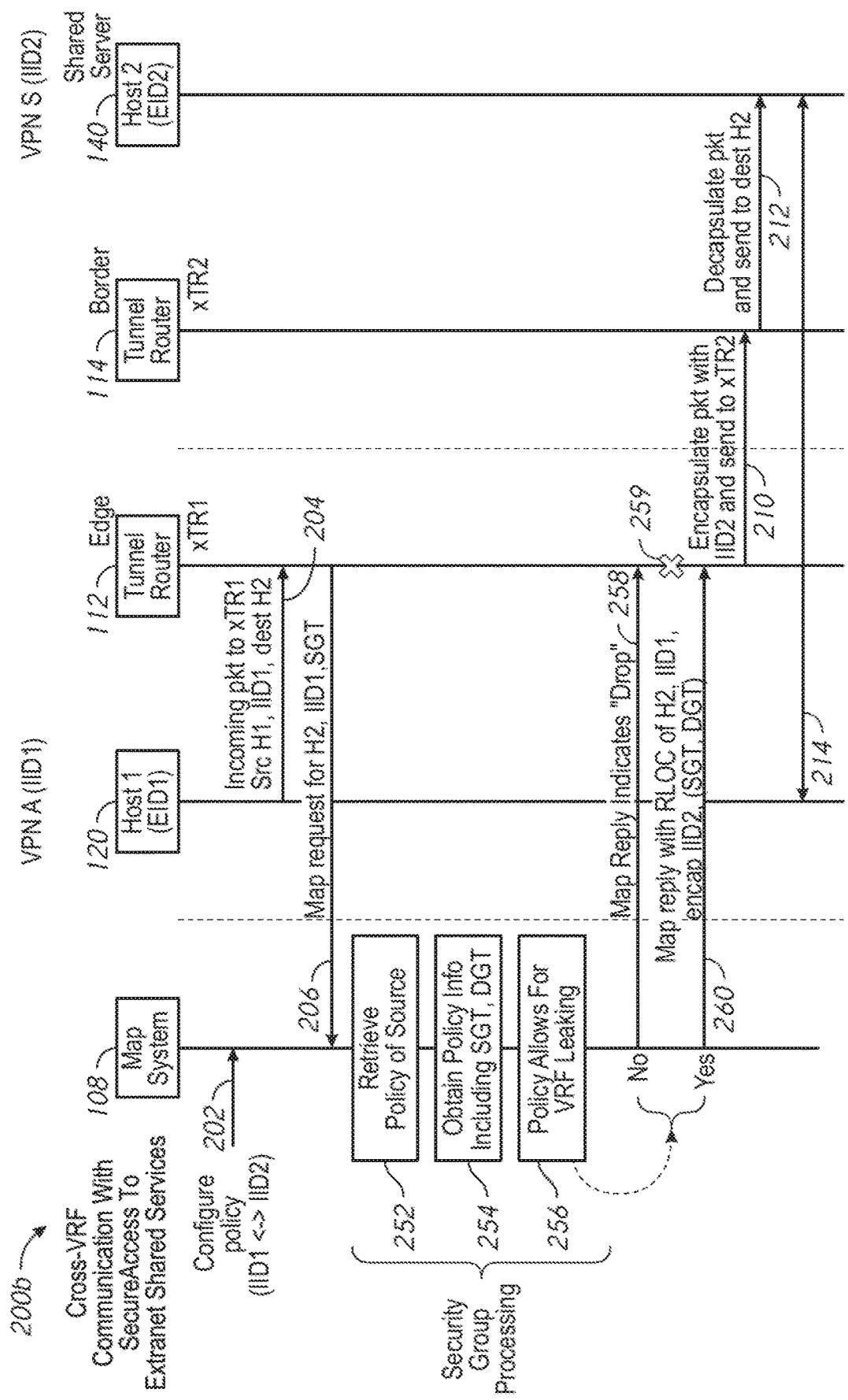
FIG. 2B is a message flow diagram for describing a method for use in a network overlay fabric for processing communications to facilitate a secure group-based access to shared services in an external (e.g. extranet) network, e.g. in the network overlay fabric in the network infrastructure arrangements in FIGS. 1A, 1B, 1D, and 1E, according to a second set of inventive aspects of the present disclosure.
Figure 3:
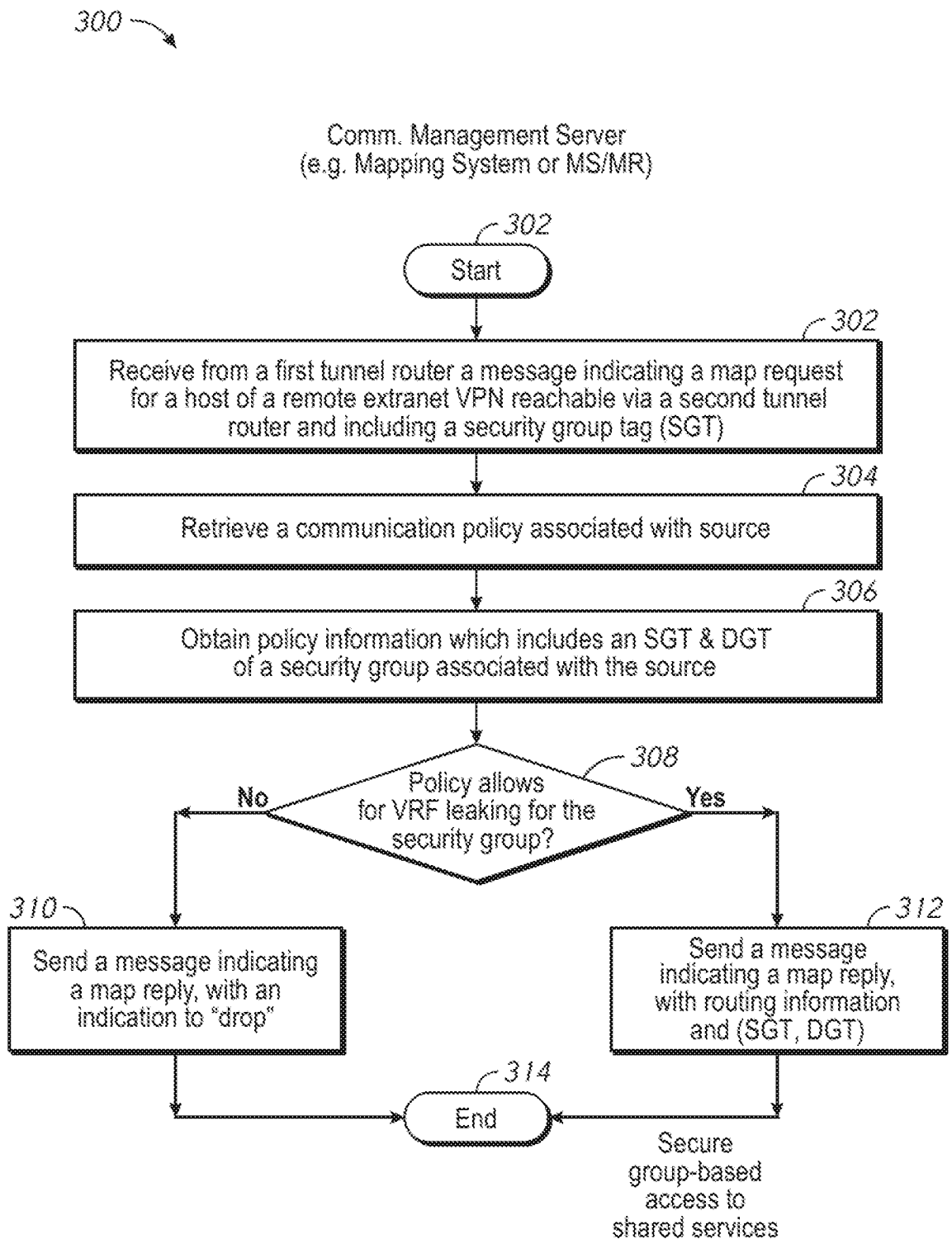
FIG. 3 is a flowchart for describing a method for use in a network overlay fabric for processing communications to facilitate a secure group-based access to shared services in an external (e.g. extranet) network, e.g. in network overlay fabric in the network infrastructure arrangements in FIGS. 1A, 1B, 1D, and 1E, according to the second set of inventive aspects of the present disclosure.

Accordingly, the first set of inventive aspects of the present disclosure which relate to publish-subscribe-based methods and apparatus to provide an auto-configurable, external network connectivity are now described in relation to FIGS. 1D, 2B and 3. As will be apparent, these methods and apparatus need not utilize the complex routing protocol (e.g. BGP) described in relation to FIG. 1C.

FIG. 1D is an illustrative representation of a network infrastructure arrangement 100D which is the same as the arrangement 100C of FIG. 1C, but where tunnel router 114 and mapping system 108 may be configured to use a publish-subscribe mechanism 195 to facilitate (at least a semi-) auto-configurable, external network connectivity to external network 180 via the router 182 according to the first set of inventive aspects of the present disclosure. Advantageously, the complex routing protocol 190 of FIG. 1C (e.g. BGP) need not be utilized.

Figure 1E:
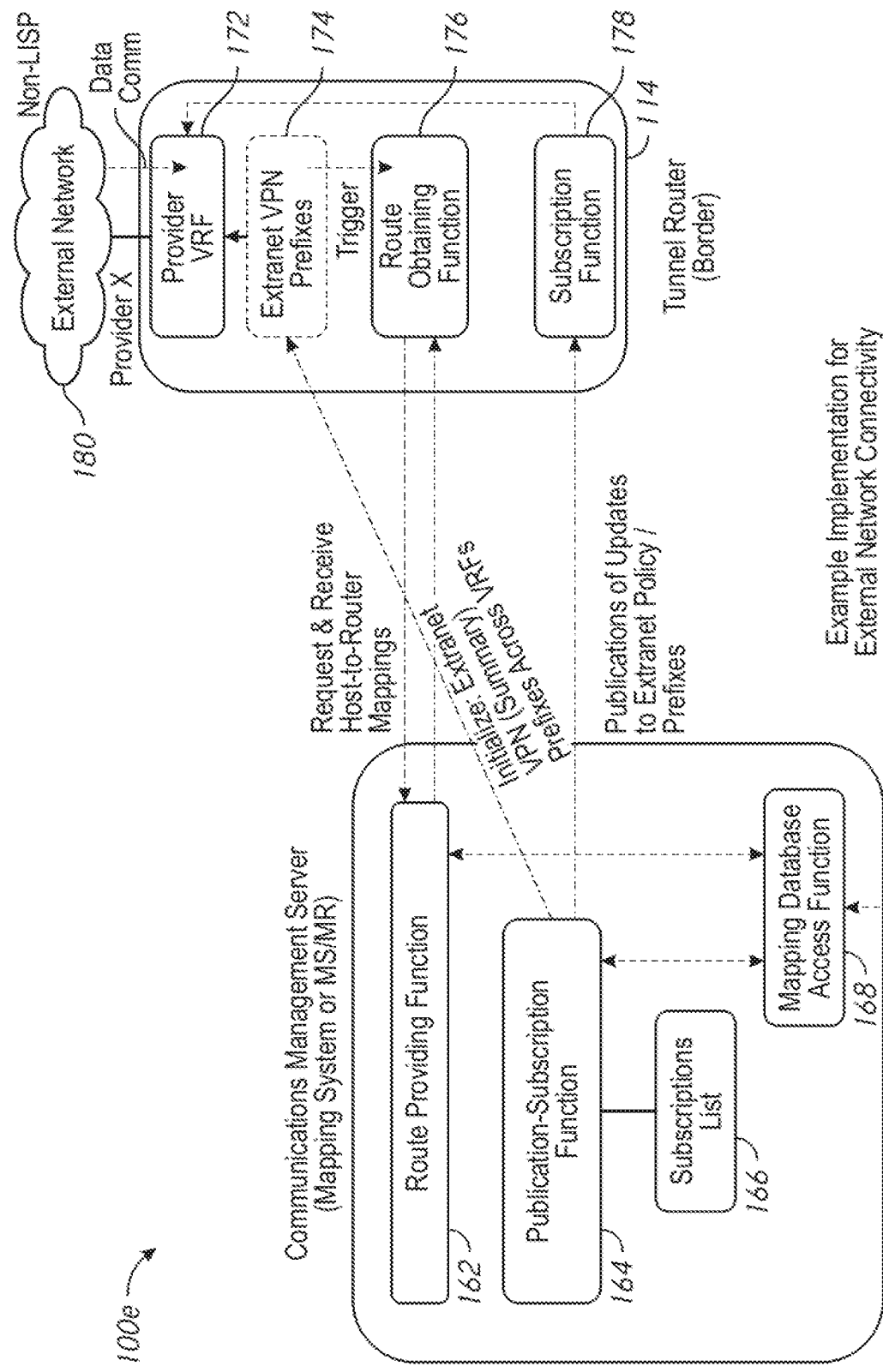
FIG. 1E is an illustrative representation of functional block diagrams of the mapping system and the tunnel router having the publish-subscribe-based mechanism for the auto-configurable, external network connectivity according to the first set of aspects of the present disclosure.

FIG. 1E is an illustrative representation of functional block diagrams 100E of the mapping system 108 and the (border) tunnel router 114 of FIG. 1D, which incorporate the publish-subscribe-based mechanism for the auto-configurable, external network connectivity according to the first set of aspects of the present disclosure. More particularly, mapping system 108 of FIG. 1E may include a route providing function 162, a publish-subscribe function 164, and a mapping database access function 168 for access a mapping database (DB) 160. Mapping system 108 may be or include and/or be more generally characterized as a communications management server or entity. Tunnel router 114 of FIG. 1E may include an external provider VRF 172, a route obtaining function 176, and a subscription function 178.

Subscription function 178 of tunnel router 114 may operate to subscribe to publications from mapping system 108 via publish-subscribe function 164 (or "publish-subscribe function"), in order to receive from mapping system 108 an initial set of extranet VPN prefixes associated with the network overlays and to regularly receive publications of updates to the extranet VPN prefixes. When received at tunnel router 114, the external VPN prefixes are stored in association with the provider VRF 172 as external VPN prefixes 174. The publish-subscribe function 164 may have access to one or more subscriptions lists 166 of (tunnel) routers that have subscribed to publications from mapping system 108. Route obtaining function 176 and route providing function 162 may operate together as described in relation to the message flow diagram 200A of FIG. 2A. In general, route obtaining function 176 may operate to, in response to receiving a communication associated with one of the stored extranet VPN prefixes 174 of the provider VRF 172, send to the mapping system 108 a message indicating request for a host-to-router mapping and receive, in response from the mapping system 108, a message indicating a reply which includes the host-to-router mapping.

Figure 4A:
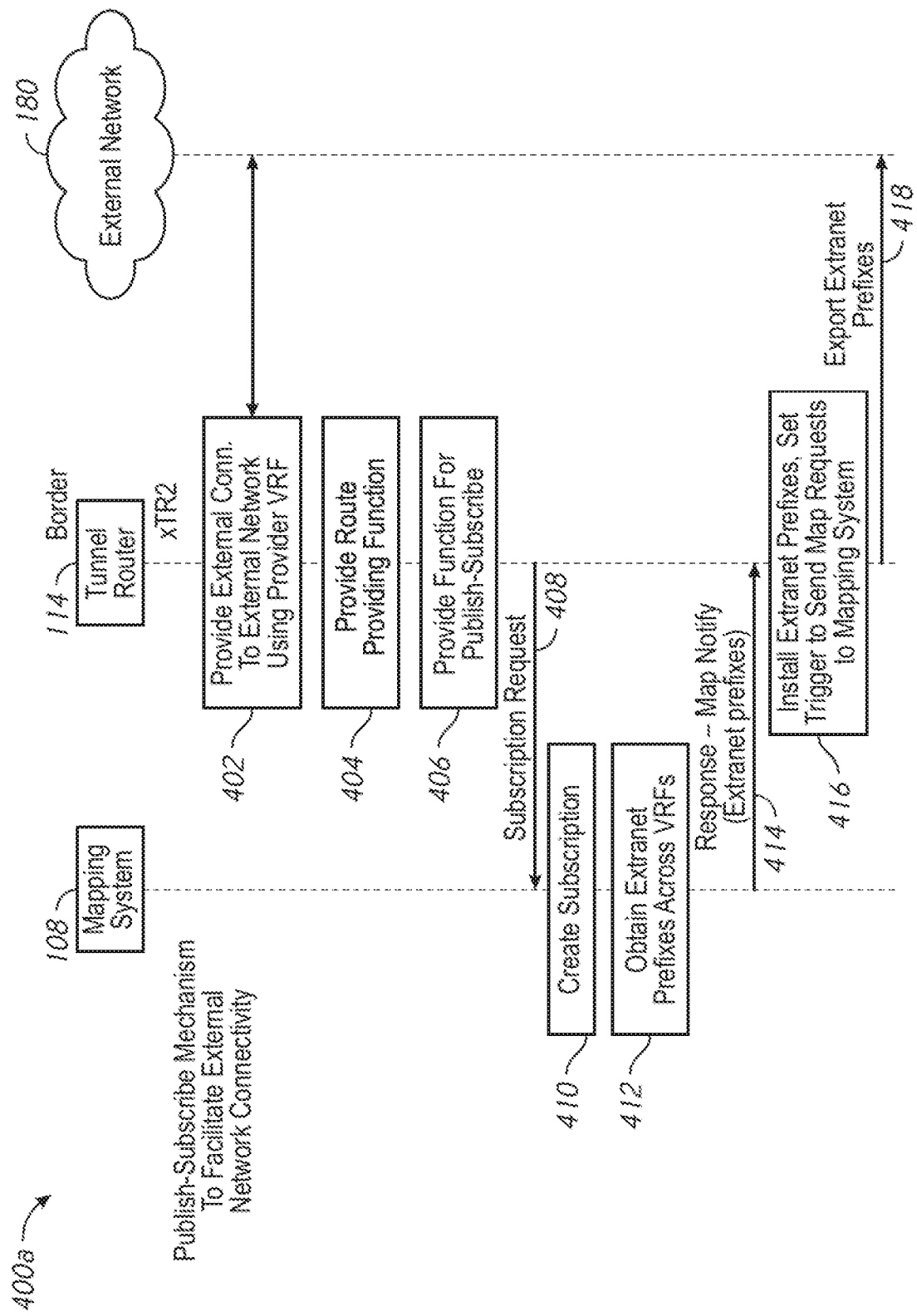

Referring ahead now to FIG. 4A, a process flow diagram 400A for describing a publish-subscribe-based method to provide an auto-configurable, external network connectivity according to the first set of inventive aspects of the present disclosure. The method may be for use in the network infrastructure arrangement 100E of FIG. 1E (associated with functional block diagrams 100E of FIG. 1E). Note that, in FIG. 4A, the border tunnel router 114 is connected to communication network 102 (FIG. 1D) and to external network 180. However, external network 180 does not employ the same network overlay protocol (e.g. LISP) used in such communication network 102. Thus, external connectivity may be enabled or facilitated with external network 180 with use of an external provider VRF associated with the external network 180 (step 402 of FIG. 4A).

A route obtaining function associated with the provider VRF may also be provided in the tunnel router 114 (step 404 of FIG. 4A). The route obtaining function may be the route obtaining function 176 of FIG. 1D. The route obtaining function may be, for example, the same or similar function as described earlier in relation to FIG. 2A, where map requests and replies are communicated with mapping system 108 to obtain route information (see e.g. route obtaining function 176 of FIG. 1E). A route update subscription function associated with the provider VRF may also be provided in the tunnel router 114 (step 406 of FIG. 4A). This subscription function may be a function for subscribing to and receiving publications of updates or changes to host-to-router mappings in mapping system 108 (see e.g. subscription function 178 of FIG. 1E).

To obtain a subscription, the tunnel router 114 may send to mapping system 108 a message indicating a request for a subscription (step 408 of FIG. 4A). The subscription request may be a request to receive publications (or "pushes") of updates or changes to host-to-router mappings in mapping system 108 in response to such updates or changes. The message may include an identifier of the tunnel router and a source IID of the provider VRF. The mapping system 108 may receive the subscription request and, in response, may create a subscription associated with the identifier of the tunnel router 114 (step 410 of FIG. 4A). Here, the mapping system 108 may add the identifier of the tunnel router 114 to a list such as a subscription list.

Here, the mapping system 108 may look up and/or obtain a plurality of extranet prefixes across a plurality of (e.g. all) VRFs (step 412 of FIG. 4A). The extranet prefixes may be obtained based on the source IID in the message. The mapping system 108 may then send to tunnel router 114 a message indicating a response to the subscription request (step 414 of FIG. 4A). The response may include the extranet prefixes across the VRFs. These extranet prefixes may be summary extranet prefixes. In other implementations, the extranet prefix may be or include non-summary prefixes. The tunnel router 114 may receive the response and install the extranet prefixes in association with the provider VRF (step 416 of FIG. 4A). The extranet prefixes may be installed in association with an action(s) or trigger(s) to send a message indicating a map request to mapping system 108, with use of the route obtaining function. Finally, the border tunnel router 114 may export the extranet prefixes to the external network 180 for installation (step 418 of FIG. 4A).

FIG. 4B is a process flow diagram 450 for describing a publish-subscribe-based method to provide an auto-configurable, external network connectivity according to the first set of inventive aspects of the present disclosure. In FIG. 4B, mapping system 108 may receive and process an update to a host-to-router mapping (step 452 of FIG. 4B). The update may be an update to a policy or an update to an extranet prefix, as examples. In response to the update, the subscription will trigger a publication to the tunnel router 114 (step 454 of FIG. 4B). Here, mapping system 108 may send to the tunnel router 114 a message which includes the update (step 456 of FIG. 4B). The tunnel router 114 may receive the message which includes the update and process the update (step 458 of FIG. 4B). The update may, in turn, be sent to the external network 180 for updating at the external network 180 (step 460 of FIG. 4B).

Figure 5C:
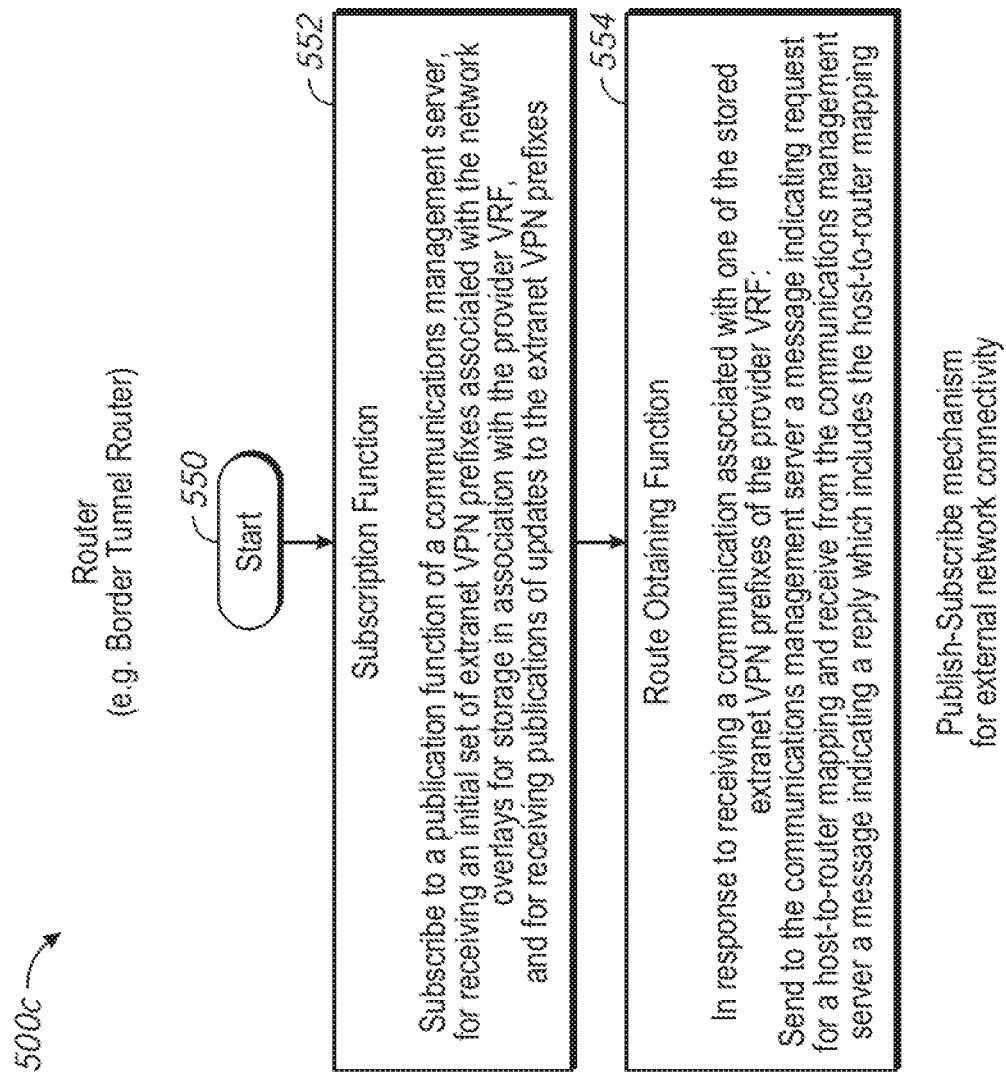

Flowcharts 500A, 500B, and 500C of FIGS. 5A, 5B, and 5C are directed to methods that correspond to the methods described in relation to FIGS. 4A and 4B. FIG. 5A shows a flowchart 500A for describing a publish-subscribe-based method to provide an auto-configurable, external network connectivity according to the first set of inventive aspects of the present disclosure. The method may be performed by a communications management server or entity, e.g. a mapping system (e.g. an MS/MR). The communications management server or entity may perform the method in association with a (border) tunnel router configured to provide connectivity to an external network with use of a (external) provider VRF.

Beginning at a start block 502 of FIG. 5A, the communications management service may receive a message indicating a subscription request from a (border) tunnel router (step 504 of FIG. 5A). The message may include an identifier of the tunnel router and a source IID associated with the VPN. In some implementations, the message may be a map request with an "S" bit set in the message format. In response, a subscription associated with the identifier of the tunnel router may be created (step 506 of FIG. 5A). A plurality of extranet prefixes across a plurality of VRFs (e.g. all VRFs) may be obtained (step 508 of FIG. 5A). The extranet prefixes may be obtained based on the source IID. The extranet prefix may be summary prefixes; in other implementations, however, the extranet prefixes may be or include non-summary prefixes. A message indicating a subscription reply may then be sent to the tunnel router, where the subscription reply includes the obtained extranet prefixes across the VRFs (step 510 of FIG. 5A). The communications management server may send to the tunnel router a message indicating a map notify, for example, as an acknowledgement. Note that the method of FIG. 5A may be performed by the communications management server or entity for each one of a plurality of border tunnel routers associated with a respective one of a plurality of external networks.

Following the flowchart 500A of FIG. 5A, FIG. 5B is a flowchart 500B for describing a publish-subscribe-based method to provide an auto-configurable, external network connectivity according to the first set of inventive aspects of the present disclosure. Again, the method may be performed by a communications management server or entity, e.g. a mapping system (e.g. an MS/MR); the communications management server or entity may perform the method in association with a border tunnel router configured to provide connectivity to an external network with use of a (external) provider VRF. The method of FIG. 5B may follow the method of FIG. 5A. Beginning at a start block 522 of FIG. 5B, an update to an extranet policy or extranet VPN prefix may be received and processed (step 524 of FIG. 5B). In response, an action associated with the subscription may be triggered (step 526 of FIG. 5B). In particular, a message comprising a publication which indicates the updated extranet policy or extranet VPN prefix may be sent to the border tunnel router having the subscription (step 528 of FIG. 5B). In response to receiving and processing the update, the border tunnel router will make the update or change to the host-to-router mapping.

FIG. 5C is a flowchart 500C for describing a publish-subscribe-based method to provide an auto-configurable, external network connectivity according to the first set of inventive aspects of the present disclosure. The method of FIG. 5C may be performed at a router (e.g. a border tunnel router) configured to process communications in accordance with the tunneling protocol to provide VPNs amongst hosts, and to process communications via an external communication network with use of an external provider VRF. Beginning at a start block 550 of FIG. 5C, the router may subscribe to a publication function of the communications management server, for receiving an initial set of extranet VPN prefixes associated with the network overlays for storage in association with the provider VRF, and for receiving publications of updates to extranet VPN prefixes associated with the network overlays (step 552 of FIG. 5C). Step 552 may be performed with use of a subscription function of the router (see e.g. subscription function 178 of FIG. 1E). Further, in response to receiving a communication associated with one of the stored extranet VPN prefixes, the router may send to the communications management server a message indicating request for a host-to-router mapping and receive from the communications management server a message indicating a reply which includes the host-to-router mapping (step 554 of FIG. 5C). Step 554 may be repeated for each received communication associated with any one of the stored extranet VPN prefixes of the provider VRF. Step 554 may be performed with use of a route obtaining function of the router (see e.g. route obtaining 176 of FIG. 1E).

The second set of inventive aspects of the present disclosure, which pertains to methods and apparatus for use in a network overlay fabric for processing communications to facilitate a secure group-based access to shared services in an external (e.g. extranet) network, are now described in relation to FIG. 2B and FIG. 3. Note that, although implementations of the present disclosure may involve access to shared services of an extranet, the present techniques may alternatively be readily applied to other types of external networks (i.e. non-extranet).

FIG. 2B is a process flow diagram 200B for describing a method for use in a network overlay fabric to provide secure group-based access to shared services in an external (e.g. extranet) network according to the second set of inventive aspects of the present disclosure. In the technique of FIG. 2B, mapping system 108 may be configured to maintain access to communication policies (e.g. an extranet cross-VRF communication policy), at least some of which may be provisioned to include security group tags (SGTs) associated with security groups having host members for access to the shared services via the extranet (e.g. access to host 140 which is a shared server).

As with the method of FIG. 2A, the method of FIG. 2B may be employed in a network infrastructure arrangement described in relation to FIG. 1A or 1B, with the following simplifications for clarity. Here again, host 120 (i.e. Host 1) is a member of VPN A associated with "IID1" and host 140 (i.e. Host 2) is a member of VPN S associated with "IID2" which is a remote extranet VPN; host 120 (i.e. Host 1) may be identified by EID1 and host 140 (i.e. Host 2) may be identified by EID2. The method of FIG. 2B may include the same or similar steps 202-206 and 210-214 described in relation to FIG. 2A, and further include "security group processing" of steps 252, 254, 256, 258, and 260.

After the configuration of step 202 of FIG. 2B, host 120 in VPN A may send to (edge) tunnel router 112 a message comprising a data packet intended for host 140 of VPN S (step 204 of FIG. 2B). The data packet may be an IP data packet. The data packet may have a source address corresponding to host 120 in VPN A, a destination address corresponding to host 140 in VPN S, and indicate a context of IID1 of VPN A. The tunnel router 112 may receive the data packet and, in response, send to mapping system 108 a message which includes a map request to request a router mapping associated with host 140 (step 206 of FIG. 2B). The map request may include the context of IID1 of VPN A, as well as an SGT.

Mapping system 108 may receive the message which includes the map request and, in response, identify the IID of the source of host 120 of VPN A (i.e. IID1), and selectively retrieve one of a plurality of communication policies (i.e. an extranet cross-VRF communication policy) associated with the identified source IID (step 252 of FIG. 2B). The retrieval of the appropriate policy may additionally or alternatively be selected based on a source VPN ID (VID) and/or source IP address of host 120 of the VPN A. Mapping system 108 may obtain, from the selected communication policy, policy information which includes an SGT associated with a security group within which host 120 is a member (step 254 of FIG. 2B).

Mapping system 108 may test or identify whether the selected communication policy allows for cross-VRF communication for the security group associated with the SGT (step 256 of FIG. 2B). If as identified in step 356 the policy does not allow or prohibits the cross-VRF communication for the security group, then mapping system 108 may send to tunnel router 112 a message indicating a map reply with an indication to "drop" the data packet (step 258 of FIG. 2B). More specifically, the message in step 258 may be a message indicating a negative map reply (NMR) which may be referred to as an NMR message. The tunnel router 112 may receive this message and, in response, "drop" or refrain from further forwarding the data packet (step 259 of FIG. 2B).

If as identified in step 256 the policy does allow the cross-VRF communication for the security group, then mapping system 108 may send to tunnel router 112 a message which includes a map reply (step 260 of FIG. 2B). The map reply in step 260 may include the address of the tunnel router which is mapped to host 140 in VPN S, the context of IID1 of VPN A, a source group tag (SGT), a destination group tag (DGT), and an encapsulated IID2 associated with the VPN S. The tunnel router 112 may receive the message which includes the map reply and, in response, proceed with the forwarding of the data packet only if permitted by the applied policy which is based on the SGT and DGT. If the forwarding is permitted by the applied policy, tunnel router 112 may encapsulate the earlier-received data packet with IID2 associated with VPN S and send to (border) tunnel router 114 the encapsulated data packet (step 210 of FIG. 2B). The tunnel router 114 may receive the encapsulated data packet and, in response, decapsulate the data packet and send the data packet to host 140 of VPN S (step 212 of FIG. 2B). Host 140 of VPN S may receive and process the data packet. Further communication may then proceed between host 120 of VPN A and host 140 of VPN S (step 214 of FIG. 2B).

FIG. 3 is a flowchart for describing a method for use in a network overlay fabric for processing communications to facilitate a secure group-based access to shared services in an external (e.g. extranet) network in accordance with the second set of inventive aspects of the present disclosure. The method may be performed by a mapping system (e.g. an MS/MR) in a communication network. In the technique of FIG. 3, the mapping system may be configured to maintain access to communication policies (e.g. a cross-VRF communication policy), at least some of which may be provisioned to include SGTs associated with security groups having host members for access to the shared services via the extranet.

A message which includes a map request may be received from a first (edge) tunnel router (step 302 of FIG. 3). The map request may also include an SGT. The map request may be for a host of a remote extranet VPN which is reachable via a second (border) tunnel router. A communication policy may be selectively retrieved based on an IID of the source of the host (step 304 of FIG. 3). The retrieval of the appropriate policy may additionally or alternatively be selected based on a source VPN ID (VID) and/or source IP address of the host. Policy information which includes an SGT and DGT associated with a security group within which the host is a member may be obtained from the policy information (step 306 of FIG. 3).

It is tested or identified whether the selected communication policy allows for cross-VPN communication for the security group (step 308 of FIG. 3). If as identified in step 308 the policy does not allow or prohibits the cross-VRF communication for the security group, then a message indicating a map reply with an indication to "drop" the data packet may be sent to the first (edge) tunnel router (step 310 of FIG. 3). More specifically, the message in step 310 may be a message indicating a negative map reply (NMR) which may be referred to as an NMR message. The first (edge) tunnel router may receive this message and, in response, "drop" or refrain from further forwarding the data packet.

If as identified in step 308 the policy does allow cross-VRF communication for the security group, then a message which includes a map reply with route information may be sent to the first (edge) tunnel router (step 312 of FIG. 3). The map reply may also include a security group (SGT, DGT) pair. The map reply in step 312 may include the address of the tunnel router which is mapped to the receiving host, the context of the source IID, and an encapsulated IID associated with the extranet VPN. The first (edge) tunnel router may receive the message which includes the map reply and, in response, proceed with the forwarding of the data packet to the receiving host. Here, the first (edge) tunnel router may encapsulate the earlier-received data packet with the encapsulating IID associated with the extranet VPN and send to a second (border) tunnel router the encapsulated data packet. The second (border) tunnel router may receive the encapsulated data packet and, in response, decapsulate the data packet and send the data packet to the receiving host.

The third set of inventive aspects of the present disclosure, which pertains to methods and apparatus for use in a network overlay fabric to facilitate a reliable, failsafe access to shared services in an external (e.g. extranet) network using a probing mechanism, are now described in relation to FIGS. 6A-6C and 7. In general, the probing mechanism operates such that a probe response from the border to the edge carries a status (e.g. reachability information) of external connectivity at the border; based on the status, the edge may decide to switch the destination to a redundant border for sending traffic. Note that, although implementations of the present disclosure may involve access to shared services of an extranet, the present techniques may alternatively be readily applied to other types of external networks (i.e. non-extranet).

Figure 6A:
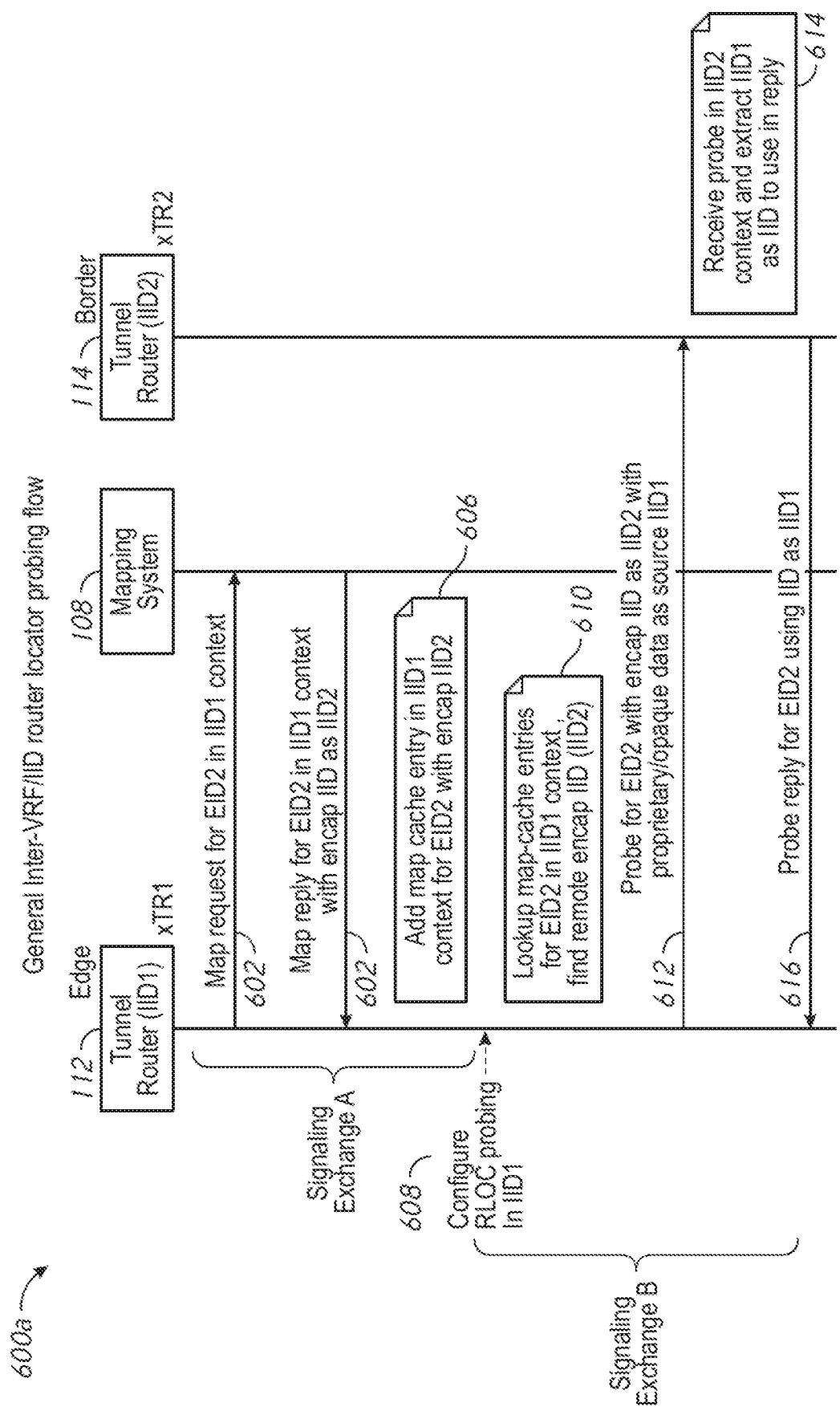
FIG. 6A is a message flow diagram for describing a method of a probing mechanism for use in a network overlay fabric, such as the network overlay fabric in the network infrastructure arrangement of FIG. 6A.

Prior to discussion of these aspects, FIG. 6A is a message flow diagram 600A for describing a general method of probing for use in a network overlay fabric. The network overlay fabric may be that which is provided in a network infrastructure arrangement 100B of FIG. 1B, with the following simplifications for clarity: host 120 (i.e. Host 1) is a member of VPN A associated with "IID1" and host 140 (i.e. Host 2) is a member of VPN S associated with "IID2" which is a remote extranet VPN; host 120 (i.e. Host 1) may be identified by EID1 and host 140 (i.e. Host 2) may be identified by EID2.

Initially in FIG. 6A of FIG. 6A, a signaling exchange "A" may take place. Tunnel router 112 ("edge router") may send to mapping system 108 a message indicating a map request for EID2 in the context of IID1 (step 602 of FIG. 6B). Mapping system 108 may receive the message and, in response, process the map request, sending to tunnel router 112 a message indicating a map reply for EID2 in the context of IID1 (step 604 of FIG. 6B). The message indicating the map reply may include IID2 as the encapsulation IID. In response, the tunnel router 112 may add to its map-cache, in the context of IID1, the host-to-router mapping for EID2 with encapsulation IID2 (step 606 of FIG. 6B). Subsequently in FIG. 6B, a signaling exchange "B" may take place. One or more messages for configuring probing in the IID1 context may be received at the tunnel router 112 (step 608 of FIG. 6B). In response, tunnel router 112 may perform a lookup for EID2 in the context of IID1 and identify a remote encapsulation IID which is encapsulation IID2 (step 610 of FIG. 6B). The tunnel router 112 may then send to the tunnel router 114 ("border router") a message indicating a probe for EID2 which the encapsulation IID as IID2 (step 612 of FIG. 6B). In some implementations, the source IID1 may be provided as proprietary and/or opaque data in the message. The tunnel router 114 may receive the probe in the context of IID2 and, in response, extract IID1 from the message to use in a reply (step 614 of FIG. 6B). The tunnel router 114 may then send to the tunnel router 112 a message indicating a probe reply for EID2 using the IID as the extracted IID1 (step 616 of FIG. 6B).

Figure 6B:
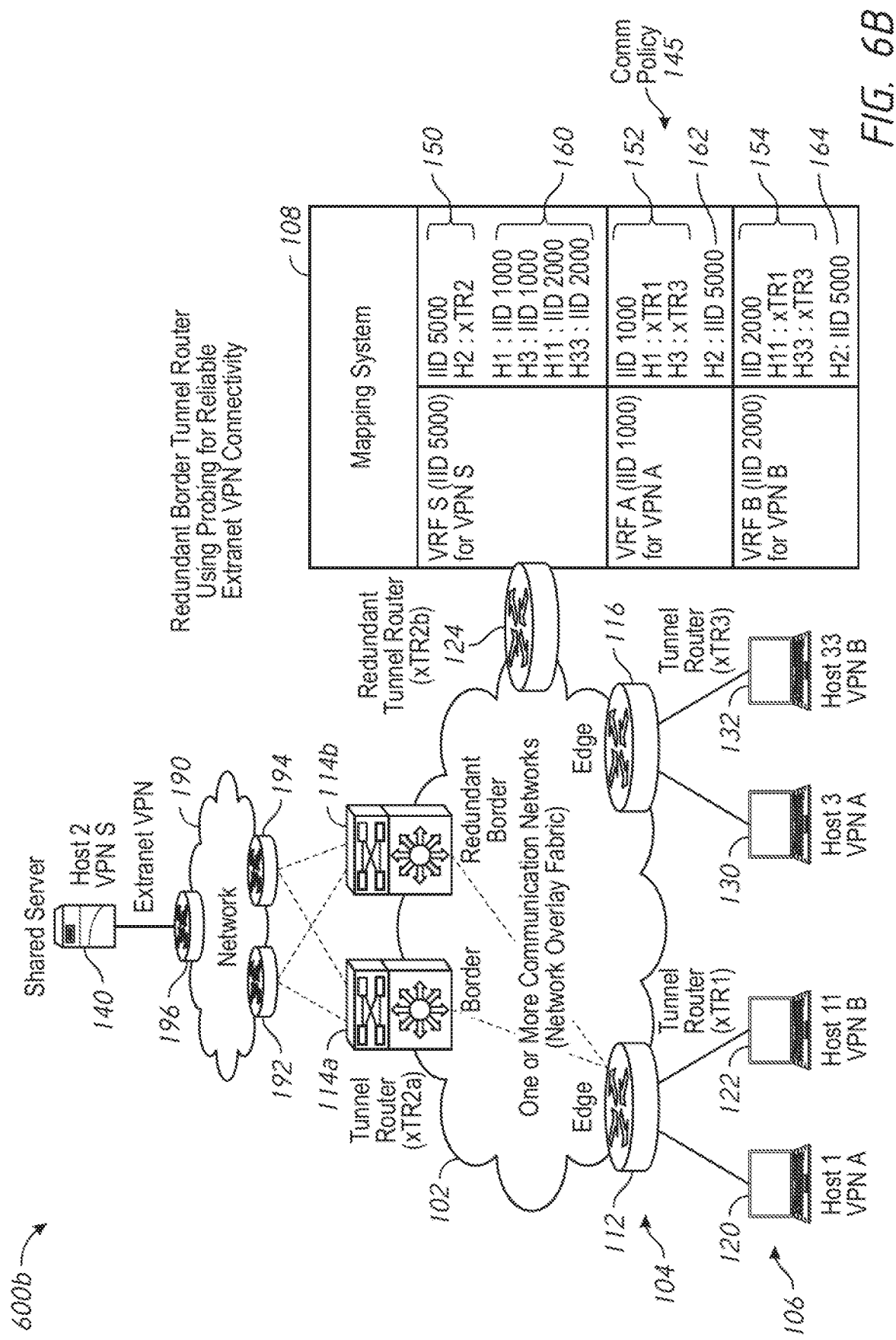
FIG. 6B is an illustrative representation of the network infrastructure arrangement of FIG. 1B, wherein a tunnel router may be used together with a redundant tunnel router to facilitate a reliable, failsafe access to shared services in an external (e.g. extranet) network using a probing mechanism according to a third set of inventive aspects of the present disclosure.

FIG. 6B is an illustrative representation of a network infrastructure arrangement 600B is shown, which is the same as the arrangement 100B shown and described in relation to FIG. 1B, but where a "redundant" tunnel router 114b is provided in addition to tunnel router 114 (now a "tunnel router 114a"). Redundant tunnel router 114b of FIG. 6B may be provided along with tunnel router 114a and communications processing to facilitate a reliable, failsafe access to shared services in an external (e.g. extranet) network using a probing mechanism in accordance with the third inventive aspect of the present disclosure. Each one of tunnel routers 104, such as tunnel router 112, may be connectable and/or communicate with each one of tunnel routers 114a and 114b. Additional context in relation to host 140 (e.g. the extranet shared server) is also illustrated in FIG. 6B, showing that host 140 may be connected via a router 196 to a communication network 190 which further includes routers 192 and 194 which may be connectable and/or communicate with each one of tunnel routers 114a and 114b. The probing mechanism used and described in relation to FIGS. 6B and 6C may be performed in accordance with the principles and/or operation described above in relation to FIG. 6A.

Figure 6C:
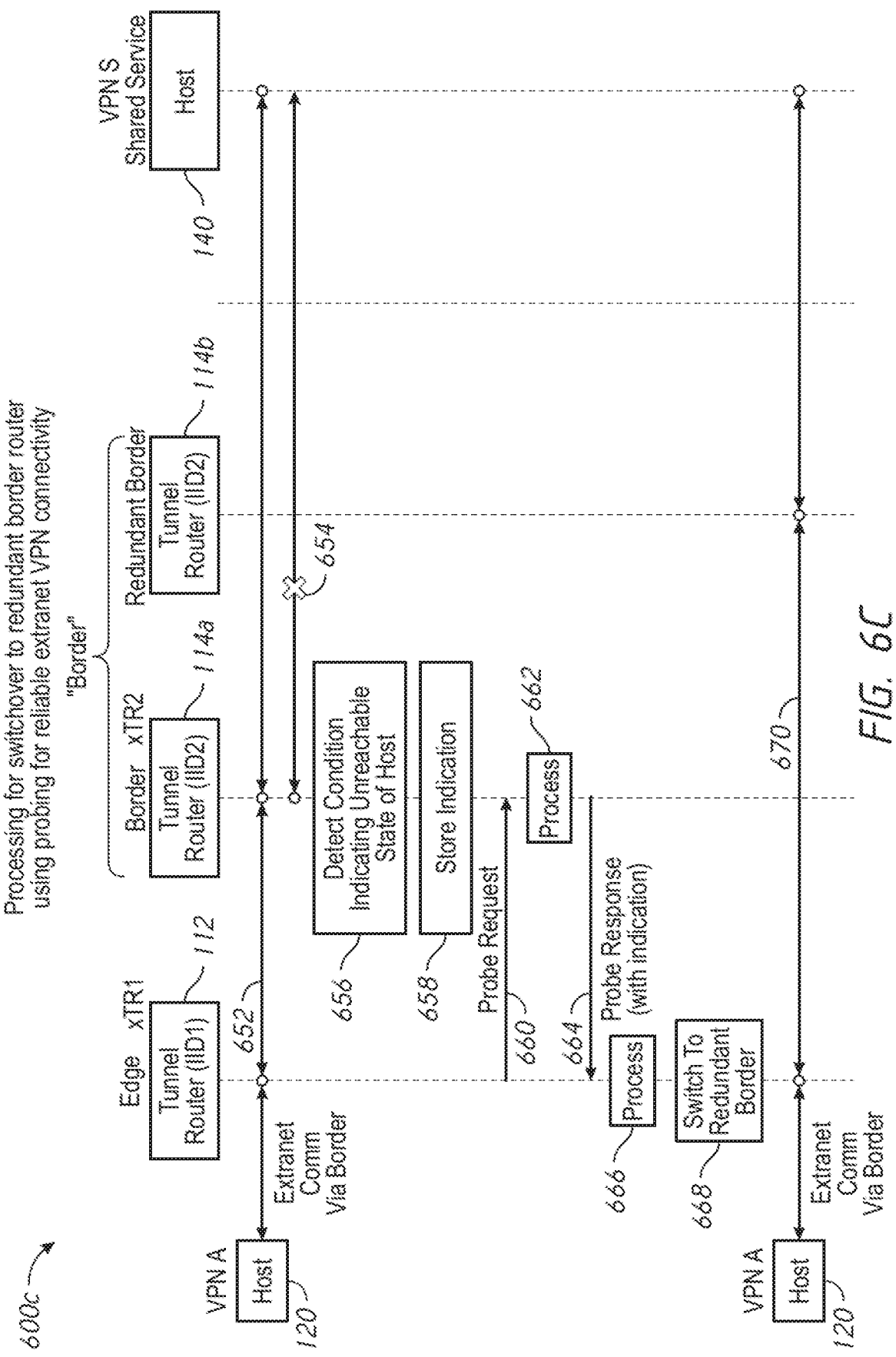
FIG. 6C is a message flow diagram for describing a method in a network overlay fabric for processing communications to facilitate a reliable, failsafe access to shared services in an external (e.g. extranet) network using a probing mechanism, e.g. in the network overlay fabric of the network infrastructure arrangement of FIG. 6B.

FIG. 6C is a process flow diagram 600C for describing a method for use in a network overlay fabric to facilitate a reliable, failsafe access to shared services in an external (e.g. extranet) network using a probing mechanism in accordance with the third inventive aspect of the present disclosure. The method may be employed in a network infrastructure arrangement such as the network infrastructure arrangement 600B of FIG. 6B, again with the following simplifications for clarity: host 120 (i.e. Host 1) is a member of VPN A associated with "IID1" and host 140 (i.e. Host 2) is a member of VPN S associated with "IID2" which is a remote extranet VPN; host 120 (i.e. Host 1) may be identified by EID1 and host 140 (i.e. Host 2) may be identified by EID2.

Initially in FIG. 6C, host 120 of VPN A (IID1) may communicate with host 140 of VPN S via (border) tunnel router 114a (step 652 of FIG. 6C). To facilitate such communication, tunnel router 112 associated with host 120 may maintain in memory a host-to-router mapping for use in forwarding data plane traffic from host 120 of VPN A to the tunnel router 114a. Sometime during operation, communication between the tunnel router 114a and host 140 is compromised, such that host 140 is unreachable via the tunnel router 114a (step 654 of FIG. 6C). The tunnel router 114a may detect this condition (step 656 of FIG. 6C) and store in memory an indication of this condition (step 658 of FIG. 6C).

As part of a regular or periodic probing process, tunnel router 112 may send to tunnel router 114a a message comprising a probe or probe request (step 660 of FIG. 6C). Tunnel router 114a may receive and process the message (step 662 of FIG. 6C). In response, tunnel router 114a may send to tunnel router 112 a message comprising a probe reply (step 664 of FIG. 6C). The probe reply may include the indication that host 140 is unreachable via tunnel router 114a. Tunnel router 112 may receive and process the message (step 666 of FIG. 6C). In the processing of the message, tunnel router 112 may identify whether the message comprising the probe reply includes the indication indicating that host 140 is unreachable via tunnel router 114a. In response to identifying such an indication, tunnel router 112 may switch from use of tunnel router 114a to use of redundant (border) tunnel router 114b for communication with host 140 (step 668 of FIG. 6C). More specifically, tunnel router 112 may change the host-to-router mapping in the memory so that data plane traffic with host 140 is forwarded via redundant tunnel router 114b. For example, the router locator (e.g. RLOC) of the host-to-router mapping may be changed from a first router locator corresponding to tunnel router 114a to a second router locator corresponding to the redundant tunnel router 114b. Accordingly, host 120 of VPN A may now communicate with host 140 of VPN S via tunnel router 114b (step 270 of FIG. 6C). A regular or periodic probing process may now take place between tunnel router 112 and tunnel router 114b. On the other hand, in response to identifying no unreachability indication in step 666, the host-to-router mapping remains unchanged (i.e. steps 668 and 670 are not performed) and the regular or periodic probing (steps 660, 662, and 664) with tunnel router 114a continues.

Figure 7:
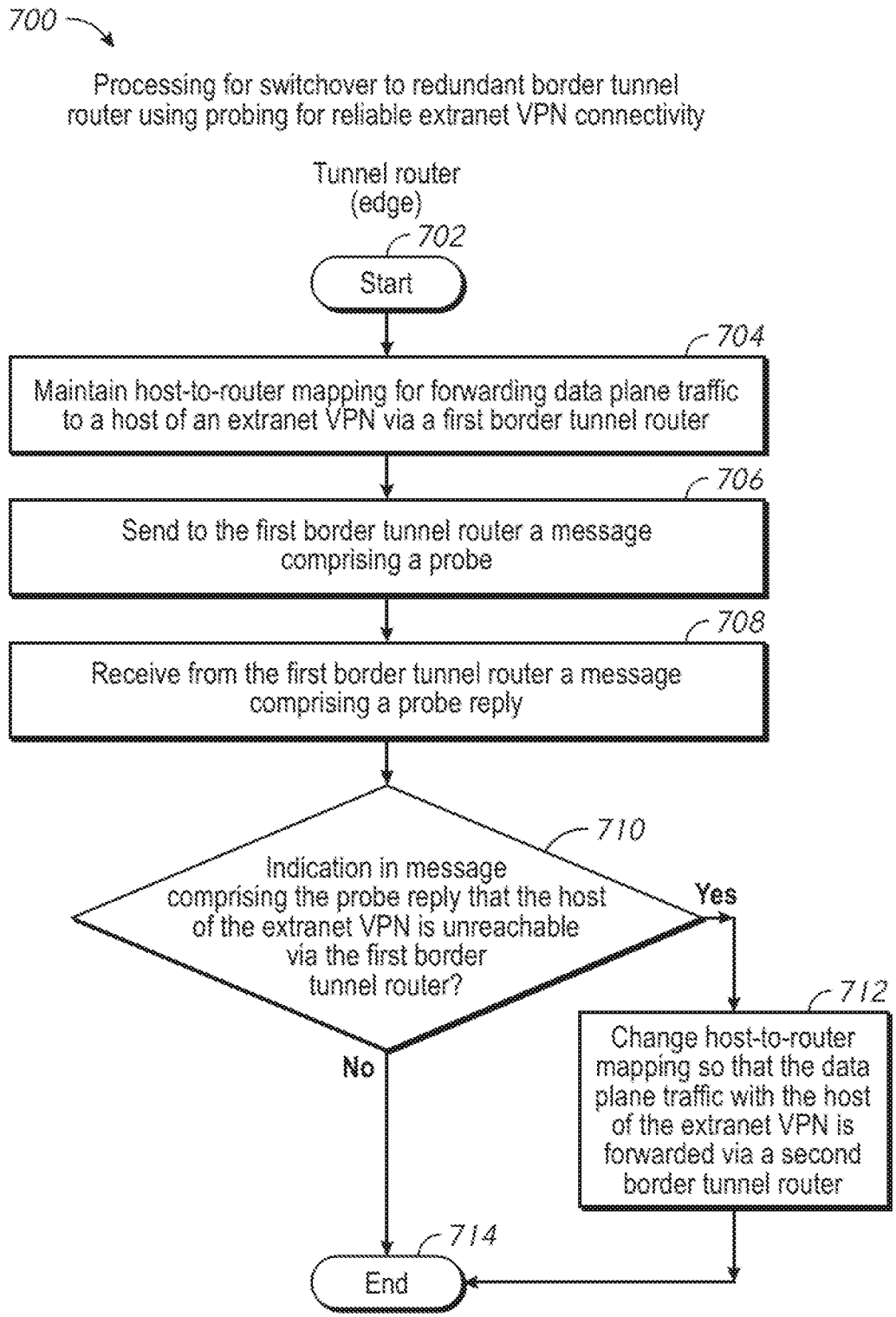
FIG. 7 is a flowchart for describing a method in a network overlay fabric for processing communications to facilitate a reliable, failsafe access to shared services in an external (e.g. extranet) network using a probing mechanism, e.g. in the network overlay fabric in the network infrastructure arrangement of FIG. 6A.

FIG. 7 is a flowchart 700 for describing a method in a network overlay fabric for processing communications to facilitate a reliable, failsafe access to shared services in an external (e.g. extranet) network using a probing mechanism in accordance with the third set of inventive aspects of the present disclosure. The method of FIG. 7 may be performed by a tunnel router (e.g. an "edge" tunnel router 112 of FIG. 6B, with operation similar to or the same as that described in relation to FIG. 6C). The method performed by the tunnel router may be performed in relation to a first border tunnel router and a second border tunnel router.

Beginning at a start block 702 of FIG. 7, a host-to-router mapping is maintained in memory of the tunnel router, where the host-to-router mapping is for use in forwarding data plane traffic to a host of a remote extranet VPN via the first border tunnel router (step 704 of FIG. 7). Message probes may be regularly or periodically sent from the tunnel router to the first border tunnel router. Accordingly, a message comprising a probe is sent to the first border tunnel router (step 706 of FIG. 7). In response, a message comprising a probe reply is received from the first border tunnel router (step 708 of FIG. 7). It is identified whether the message comprising the probe reply includes an indication which indicates that the host of the remote extranet VPN is unreachable via the first border tunnel router (step 710 of FIG. 7). In response to identifying such an indication at step 710, the host-to-router mapping in the memory of the tunnel router is changed so that data plane traffic with the host of the extranet VPN is forwarded via the second border tunnel router (step 712 of FIG. 7). For example, the router locator (e.g. RLOC) of the host-to-router mapping may be changed from a first router locator corresponding to the first border tunnel router to a second router locator corresponding to the second border tunnel router. In response to identifying no such unreachability indication, the host-to-router mapping remains unchanged. Steps 706, 708, 710, and 712 of FIG. 7 may be repeated a plurality of times, in a regular or periodic fashion. For example, the repeated probing of step 706 may be a regular or periodic probing.

Figure 8A:
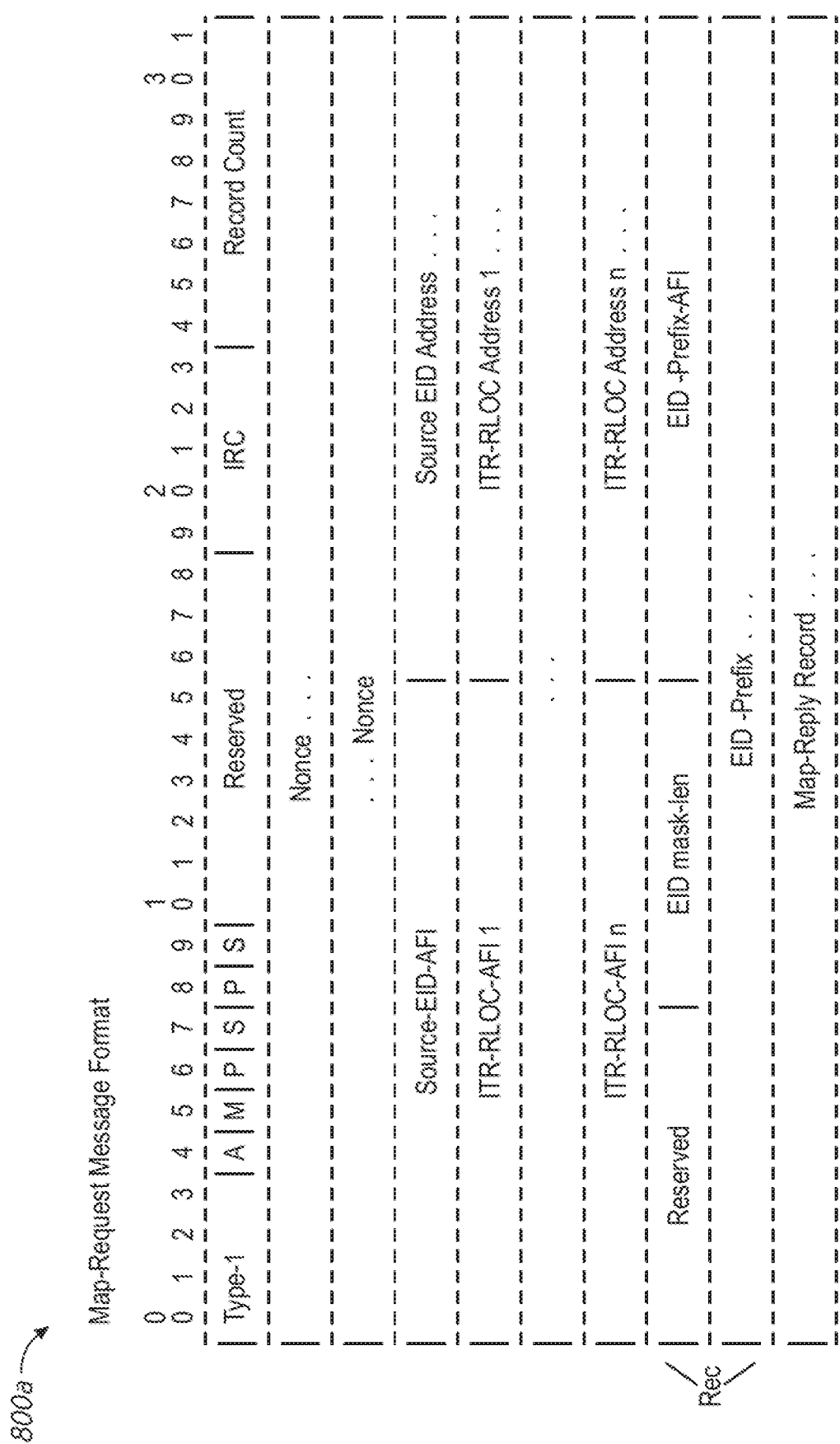

FIGS. 8A-8C are message formats 802, 820, and 840 of messages which may be used for implementations involving LISP. The message formats 802, 820, and 804 of FIGS. 8A-8C may be used for the map requests and map replies. Note that, in some implementations of extranet communication using LISP messaging, the Source-EID may carry the EID+IID of the sender while the EID-Prefix may carry the destination EID+IID which may be different. Also note that, in the third set of inventive aspects using the probing mechanism, the "P" bit may be set in a map request for a message comprising a probe.

Thus, methods and apparatus for use in a network overlay fabric to better facilitate external network connectivity including access to extranet shared services have been described. In a first set of inventive aspects, what has been described are publish-subscribe-based methods and apparatus for use in a network overlay fabric to provide an auto-configurable, external network connectivity. In a second set of inventive aspects, what has been described are methods and apparatus for use in a network overlay fabric for a secure group-based access to shared services in an external (e.g. extranet) network. In a third set of inventive aspects, what has been described are methods and apparatus in a network overlay fabric to facilitate a reliable, failsafe access to shared services in an external (e.g. extranet) network using a probing mechanism. Although some implementations of the present disclosure have been applied to an extranet as described, the present techniques may be readily applied to other types of external networks (i.e. non-extranet).

In the first set of inventive aspects, publish-subscribe-based methods and apparatus for use in a network overlay fabric to provide an auto-configurable, external network connectivity are provided. In one illustrative example, a router may be configured to process communications in accordance with a tunneling protocol (e.g. LISP) to provide network overlay tunnels in one or more communication networks to facilitate virtual private networks (VPN) for a plurality of hosts, and to process communications associated with an external communication network (e.g. a non-LISP network) with use of a provider virtualization routing and forwarding (VRF) instance. With use of a subscription function, the router may receive from a communications management server or entity an initial set of extranet VPN prefixes associated with the network overlays for storage in association with the provider VRF, as well as receive publications of updates to extranet VPN prefixes associated with the network overlays. With use of a route obtaining function, the router may, in response to receiving a communication associated with one of the stored extranet VPN prefixes at the provider VRF, send to the communications management server a message indicating request for a host-to-router mapping and receive from the communications management server a message indicating a reply which includes the host-to-router mapping.

In another illustrative example of the first set of inventive aspects, a communications management server or entity may be configured to facilitate communications for a plurality of routers, each of which may communicate in accordance with a tunneling protocol (e.g. LISP) to provide network overlay tunnels in one or more communication networks to facilitate VPNs for a plurality of hosts, wherein at least one of the routers is configured to process communications via an external communication network with use of an external provider VRF instance. The server may create a subscription associated with the router having the provider VRF for the external communication network, which may include sending to the router an initial set of extranet VPN prefixes associated with the network overlays for storage in association with the provider VRF at the router, and sending to the router publications of updates to extranet VPN prefixes associated with the network overlays. In response to the provider VRF receiving a communication associated with one of the stored extranet VPN prefixes, the server may receive from the router a message indicating request for a host-to-router mapping and send to the router a message indicating a reply which includes the host-to-router mapping.

In the second set of inventive aspects, method and apparatus for use in a network overlay fabric for a secure group-based access to shared services in an external (e.g. extranet) network are provided. In one illustrative example, a communications management server or entity may be configured for use with a plurality of routers in one or more communications networks, wherein each router is configured to communicate in accordance with a tunneling protocol to provide network overlay tunnels in the one or more communication networks to facilitate VPNs for hosts. The server may be a mapping system or a map server/map resolver (MS/MR). The server may receive a message indicating a request for a host-to-router mapping for a host comprising a shared server in a remote extranet VPN, in response to the router's receipt of a data packet communication destined to the shared server in the remote extranet VPN. The server may obtain communication policy data based on a source identifier in the message, where the communication policy data includes source and destination security group tags (e.g. SGT and DGT) associated with security groups. Based on destination host registration and the communication policy data allowing the data packet communication for the security group, the server may send to the router a message indicating a reply which includes the host-to-router mapping for the host comprising the shared server, as well as source and destination security group tags (e.g. SGT and DGT) and associated policy. On the other hand, based on the communication policy data prohibiting the data packet communication for the security group, the server may send to the router a message indicating a reply which includes an indication to drop the data packet communication.

In the third set of inventive aspects, methods and apparatus for use in a network overlay fabric for processing communications to facilitate a reliable, failsafe access to shared services in an external (e.g. extranet) network using a probing mechanism are provided. In one illustrative example, a router (e.g. an "edge" router) may be configured to process communications in accordance with a tunneling protocol to provide network overlay tunnels in one or more communication networks to facilitate VPNs for hosts. The router may be configured to maintain a host-to-router mapping for forwarding data plane traffic to a host of an extranet VPN via a first border router. The router may be further configured to send to the first border router a message comprising a probe and receive from the first border router a message comprising a probe reply. In response to identifying, in the message comprising the probe reply, an indication that the host or its external network is unreachable via the first border router, the router may change the host-to-router mapping in the edge router so that data plane traffic with the host of the extranet VPN is forwarded via a second border router.

Note that, although in some implementations of the present disclosure, one or more (or all) of the components, functions, and/or techniques described in relation to the figures may be employed together for operation in a cooperative manner, each one of the components, functions, and/or techniques may indeed be employed separately and individually, to facilitate or provide one or more advantages of the present disclosure.

While various aspects of implementations within the scope of the appended claims are described above, it should be apparent that the various features of implementations described above may be embodied in a wide variety of forms and that any specific structure and/or function described above is merely illustrative. Based on the present disclosure one skilled in the art should appreciate that an aspect described herein may be implemented independently of any other aspects and that two or more of these aspects may be combined in various ways. For example, an apparatus may be implemented and/or a method may be practiced using any number of the aspects set forth herein. In addition, such an apparatus may be implemented and/or such a method may be practiced using other structure and/or functionality in addition to or other than one or more of the aspects set forth herein.

It will also be understood that, although the terms "first," "second," etc. may be used herein to describe various elements, these elements should not be limited by these terms. These terms are used to distinguish one element from another. For example, a first node could be termed a second node, and similarly, a second node could be termed a first node, without changing the meaning of the description, so long as all occurrences of the "first node" are renamed consistently and all occurrences of the "second node" are renamed consistently. The first node and the second node are both nodes, but they are not the same node.

The terminology used herein is for the purpose of describing particular embodiments only and is not intended to be limiting of the claims. As used in the description of the embodiments and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

What is claimed is:

1. A method comprising:
   at a router configured to process communications in accordance with a tunneling protocol to provide network overlay tunnels for communications with hosts in one or more communication networks for virtual private networking (VPN), and to process communications via an external communication network with use of a provider virtualization routing and forwarding (VRF) instance,
   subscribing to publications of a communications management server, to receive an initial set of extranet VPN prefixes associated with network overlays for storage in association with the provider VRF, and to receive publications of updates to extranet VPN prefixes associated with the network overlays; and
   in response to receiving a communication associated with one of the stored extranet VPN prefixes: sending to the communications management server a message indicating request for a host-to-router mapping and receiving from the communications management server a message indicating a reply which includes the host-to-router mapping.

2. The method of claim 1, wherein subscribing to the publications of the communications management server further comprises:
   sending to the communications management server a message indicating a subscription request, which triggers the receiving from the communications management server one or more messages including the initial set of extranet VPN prefixes.

3. The method of claim 1, wherein receiving the initial set of extranet VPN prefixes comprises receiving extranet VPN prefixes across a plurality of VRFs at the communications management server.

4. The method of claim 1, wherein the sending and the receiving are performed in response to each communication associated with each one of a plurality of the stored extranet VPN prefixes.

5. The method of claim 1, wherein the initial set of extranet VPN prefixes comprise summary prefixes.

6. The method of claim 1, wherein the initial set of extranet VPN prefixes comprise non-summary prefixes.

7. The method of claim 1, wherein the router is configured to process communications associated with the external communication network which is configured without use of the tunneling protocol for network overlay tunnels.

8. The method of claim 1, wherein the router is configured to subscribe to publications of the communication management server which comprises a map server (MS)/map resolver (MR) function.

9. A router comprising:
   one or more processors configured to process communications in accordance with a tunneling protocol to provide network overlays for communications amongst hosts in one or more communication networks for virtual private networking (VPN), and to process communications associated with an external communication network with use of a provider virtualization routing and forwarding (VRF) instance;
   the one or more processors having:
      a subscription function configured to subscribe to publications from a communications management server or entity, in order to receive an initial set of extranet VPN prefixes associated with the network overlays for storage in association with the provider VRF and to receive publications of updates to extranet VPN prefixes associated with the network overlays; and
      a route obtaining function configured to, in response to receiving a communication associated with one of the stored extranet VPN prefixes of the provider VRF, send to the communications management server a message indicating request for a host-to-router mapping and receive from the communications management server a message indicating a reply which includes the host-to-router mapping.

10. The router of claim 9, wherein the subscription function is further configured to subscribe to the publications of the communications management server by sending to the communications management server a message indicating a subscription request, which triggers the receiving from the communications management server one or more messages including the initial set of extranet VPN prefixes.

11. The router of claim 9, wherein the route obtaining function is further configured to perform the sending and the receiving in response to each communication associated with any one of the stored extranet VPN prefixes.

12. The router of claim 9, wherein the initial set of extranet VPN prefixes comprise summary prefixes.

13. The router of claim 9, wherein the subscription function is configured to receive the initial set of extranet VPN prefixes which comprises combined extranet VPN prefixes across a plurality of VRFs.

14. The router of claim 9, wherein the router is configured to process communications associated with the external communication network that is configured to process communications without use of the tunneling protocol for network overlay tunnels.

15. The router of claim 9, wherein the subscription function is configured to subscribe to publications from the communications management server or entity which comprises a map server (MS)/map resolver (MR) function.

16. A method comprising:
   at a communications management server or entity configured to facilitate communications amongst routers which communicate in accordance with a tunneling protocol to provide network overlay tunnels for communications with hosts in one or more communication networks for virtual private networking (VPN), wherein at least one of the routers is configured to process communications via an external communication network with use of a provider virtualization routing and forwarding (VRF) instance,
   creating a subscription associated with the router having the provider VRF for the external communication network, including:
      sending to the router an initial set of extranet VPN prefixes associated with network overlays for storage in association with the provider VRF at the router; and
      sending to the router publications of updates to extranet VPN prefixes associated with the network overlays;
   in response to the provider VRF receiving a communication associated with one of the stored extranet VPN prefixes: receiving from the router a message indicating request for a host-to-router mapping and sending to the router a message indicating a reply which includes the host-to-router mapping.

17. The method of claim 16, wherein the sending and the receiving are performed in response to each communication associated with any one of the stored extranet VPN prefixes.

18. The method of claim 16, wherein the initial set of extranet VPN prefixes comprises combined extranet VPN prefixes across a plurality of VRFs.

19. The method of claim 16, wherein the communications management server comprises a map server/map resolver (MS/MR).

\* \* \* \* \*